United States Patent
Miyake

[11] Patent Number: 5,875,268
[45] Date of Patent: Feb. 23, 1999

[54] IMAGE PROCESSING WITH LOW-RESOLUTION TO HIGH-RESOLUTION CONVERSION

[75] Inventor: Nobutaka Miyake, Yokohama, Japan

[73] Assignee: Canon Kabushiki Kaisha, Tokyo, Japan

[21] Appl. No.: 792,119

[22] Filed: Jan. 31, 1997

Related U.S. Application Data

[63] Continuation of Ser. No. 311,560, Sep. 23, 1994, abandoned.

[30] Foreign Application Priority Data

| Sep. 27, 1993 | [JP] | Japan | 5-239993 |
| Sep. 30, 1993 | [JP] | Japan | 5-244737 |
| Sep. 30, 1993 | [JP] | Japan | 5-244958 |

[51] Int. Cl.⁶ .............................. G06K 9/36; G06K 9/32
[52] U.S. Cl. ................ 382/276; 382/269; 382/299; 382/300
[58] Field of Search ...................... 382/269, 299, 382/300, 276

[56] References Cited

U.S. PATENT DOCUMENTS

| 4,437,122 | 3/1984 | Walsh et al. | 358/166 |
| 4,725,892 | 2/1988 | Suzuki et al. | 382/299 |
| 5,054,100 | 10/1991 | Tai | 382/300 |
| 5,131,057 | 7/1992 | Walowit et al. | 382/300 |
| 5,142,616 | 8/1992 | Kellas et al. | 395/135 |
| 5,191,416 | 3/1993 | Dickson et al. | 358/140 |
| 5,208,871 | 5/1993 | Eschbach | 382/299 |
| 5,280,546 | 1/1994 | Machida et al. | 382/299 |
| 5,345,517 | 9/1994 | Katayama et al. | 382/299 |
| 5,363,213 | 11/1994 | Coward et al. | 382/299 |
| 5,379,072 | 1/1995 | Kondo | 348/441 |
| 5,386,509 | 1/1995 | Suzuki et al. | 382/269 |
| 5,410,615 | 4/1995 | Mailloux | 382/299 |

FOREIGN PATENT DOCUMENTS

| 318866 | 12/1987 | European Pat. Off. | G06F 15/68 |
| 479483 | 4/1992 | European Pat. Off. | H04N 5/208 |

*Primary Examiner*—Andrew W. Johns
*Assistant Examiner*—Monica S. Davis
*Attorney, Agent, or Firm*—Fitzpatrick Cella Harper & Scinto

[57] ABSTRACT

An image processing apparatus for converting low-resolution information to high-resolution information and increasing the number of pixels of input image information by a factor of (N×M) includes interpolating unit for interpolating one pixel of low-resolution information to (N×M) pixels, quantizing unit for quantizing, to n values (n≧2), image information within a block of (N×M) pixels after interpolation by the interpolating unit corresponding to a low-resolution pixel of interest, and arithmetic unit for summing and combining, at a set allocation ratio, information quantized by the quantizing unit and interpolated information from the interpolating unit, thereby making it possible to convert a low-resolution image to a high-resolution image and to obtain a high picture quality.

25 Claims, 46 Drawing Sheets

LINEARLY INTERPOLATED INFORMATION

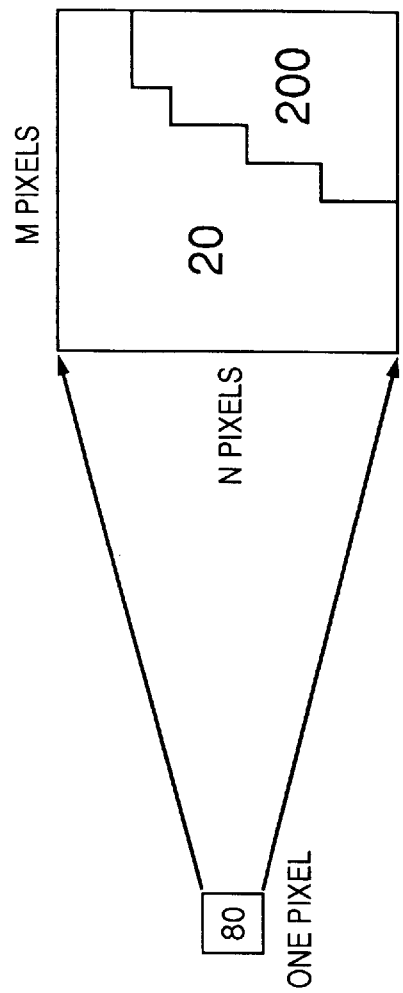
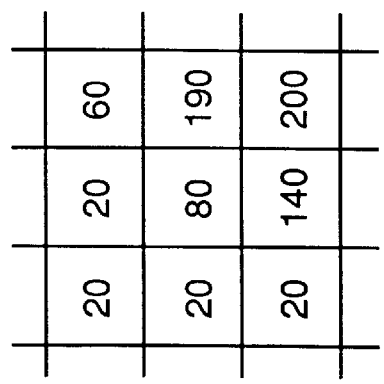

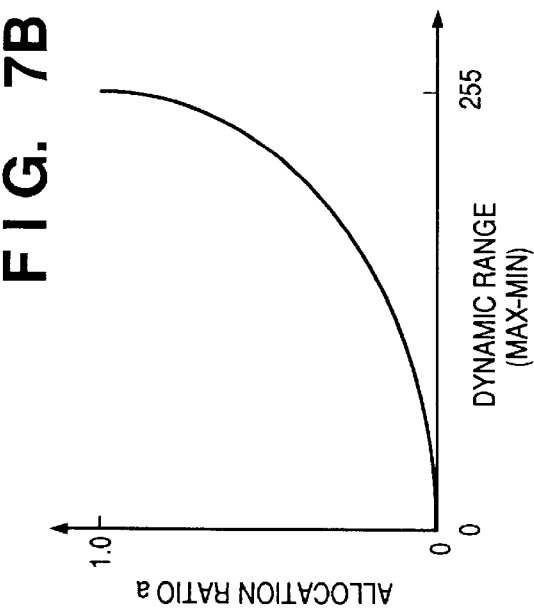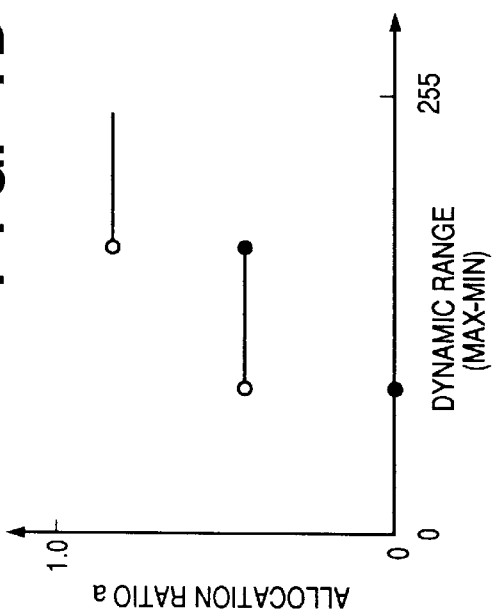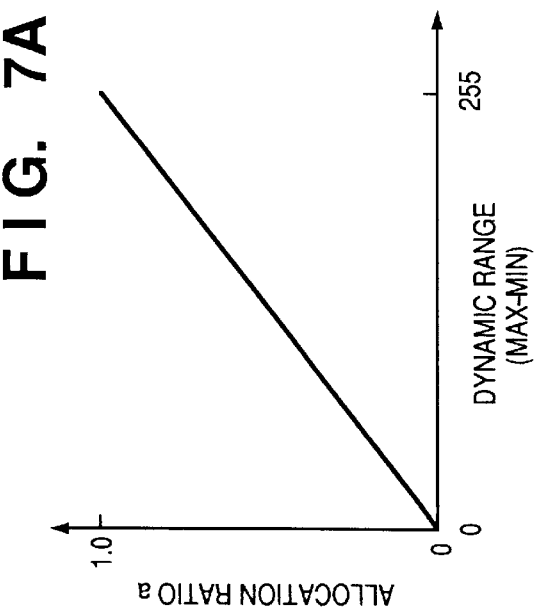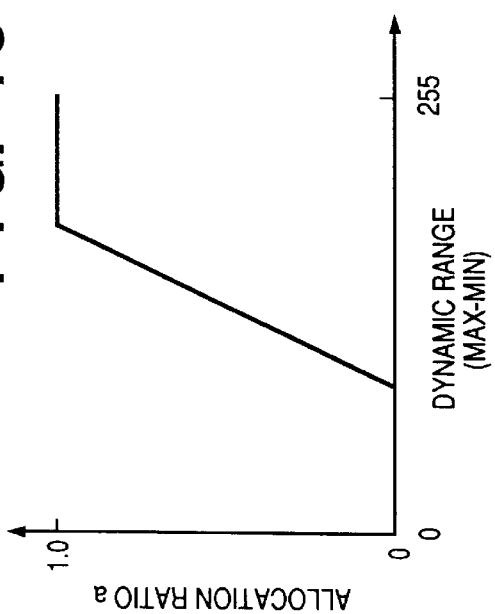

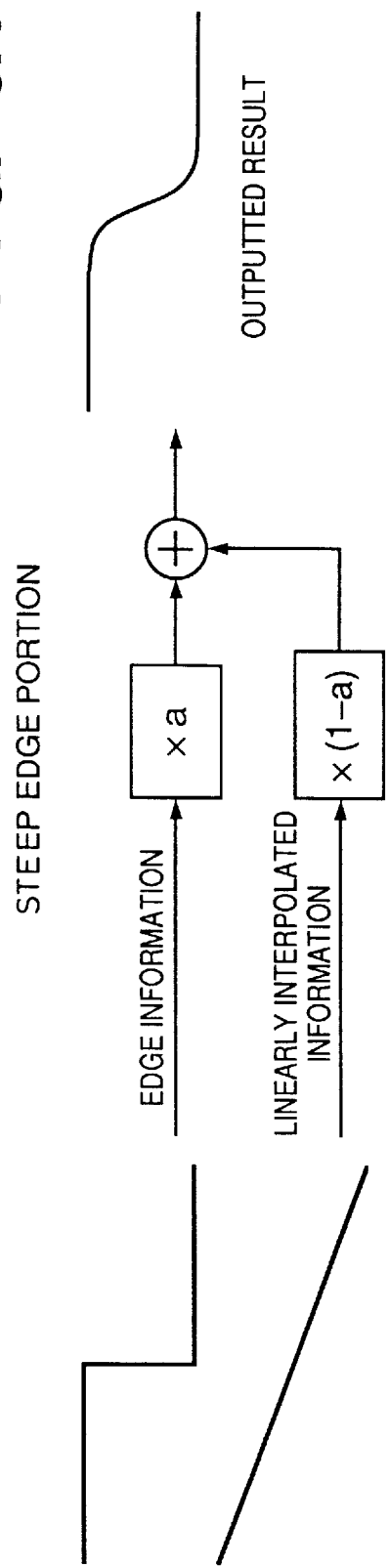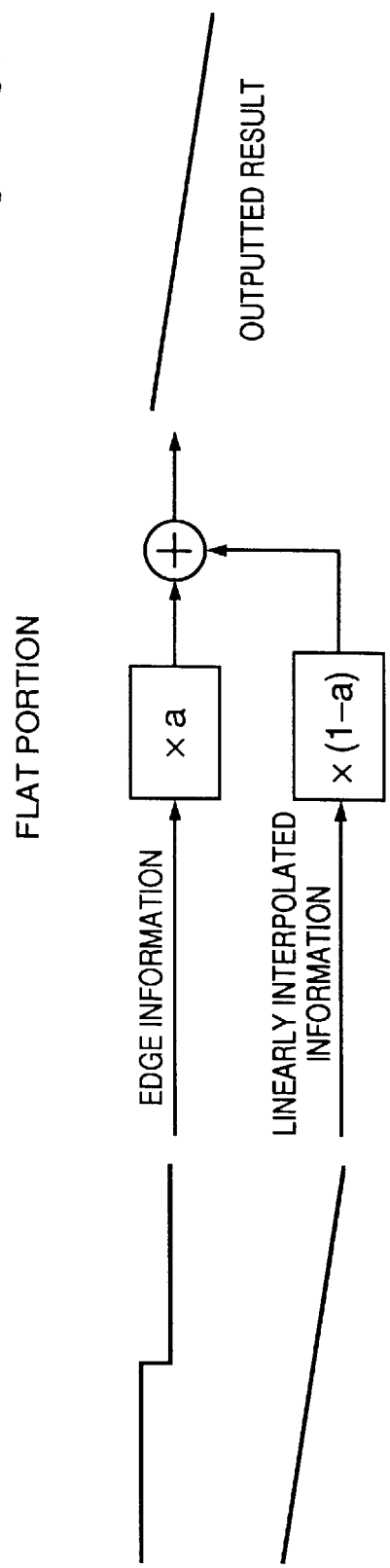

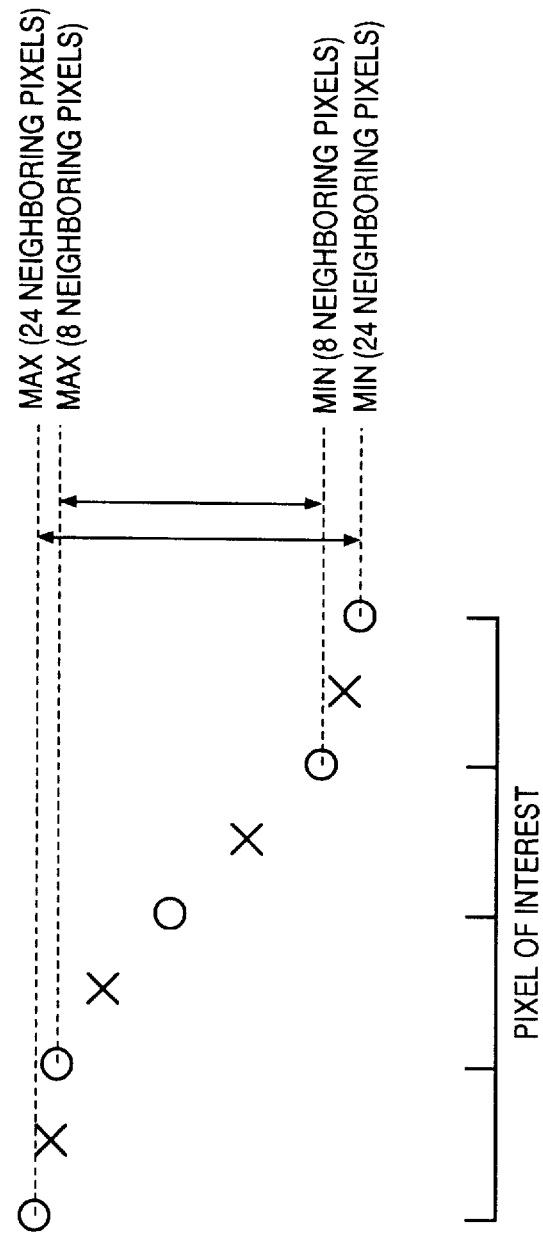

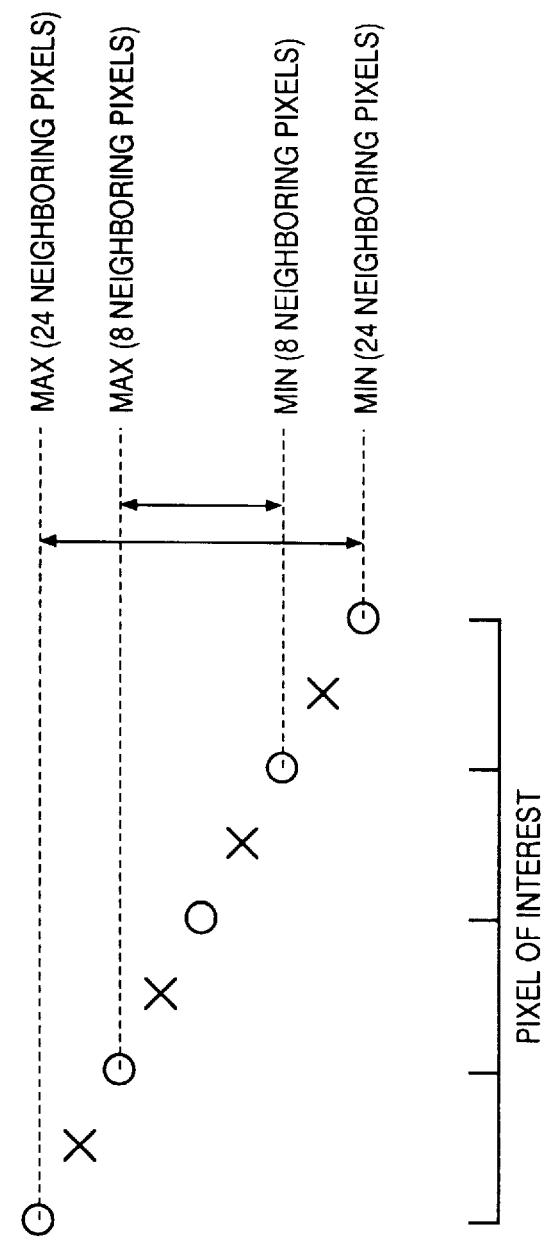

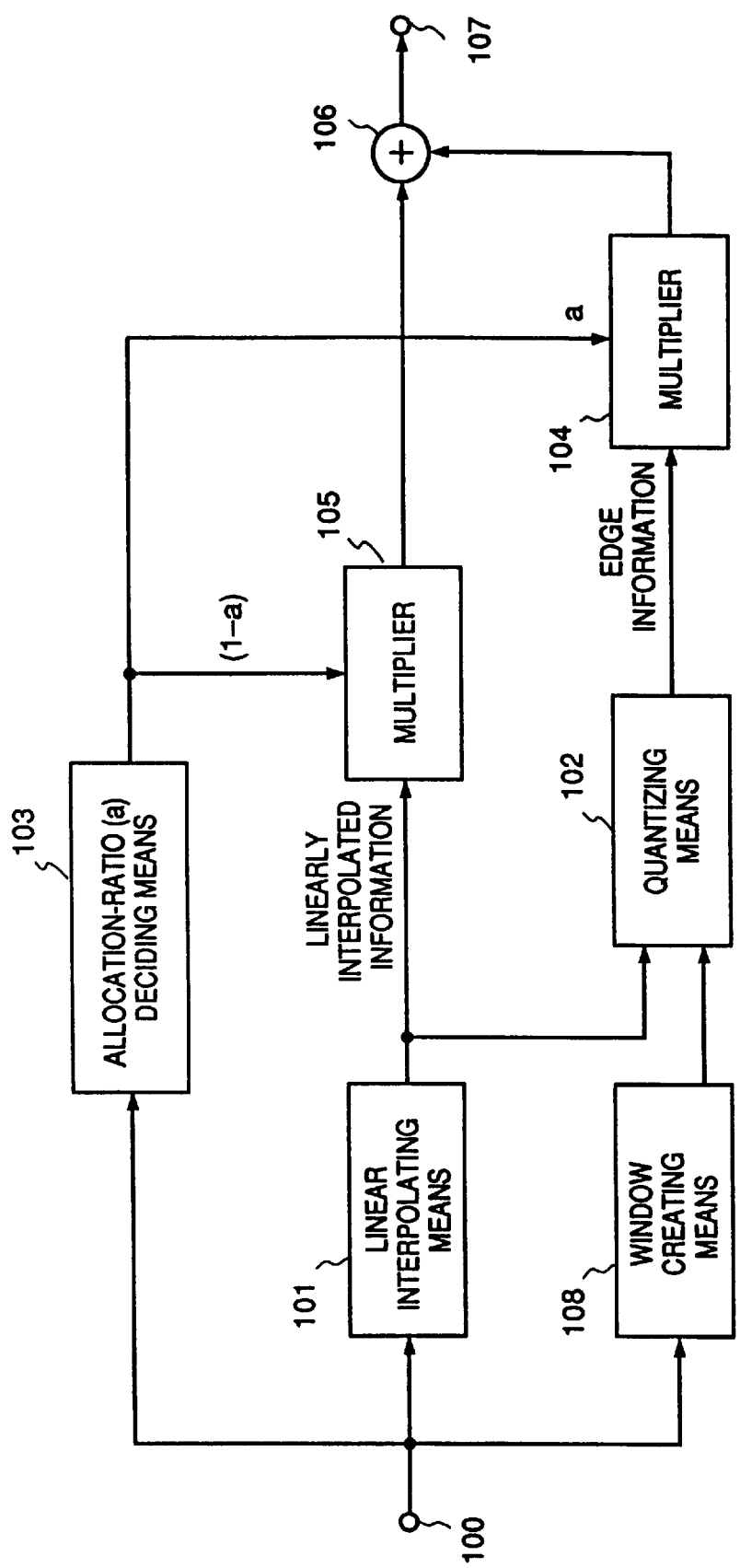

F I G. 13

| 1 | 1 | 1 |
|---|---|---|
| 1 | 1 | 1 |
| 1 | 1 | 1 |

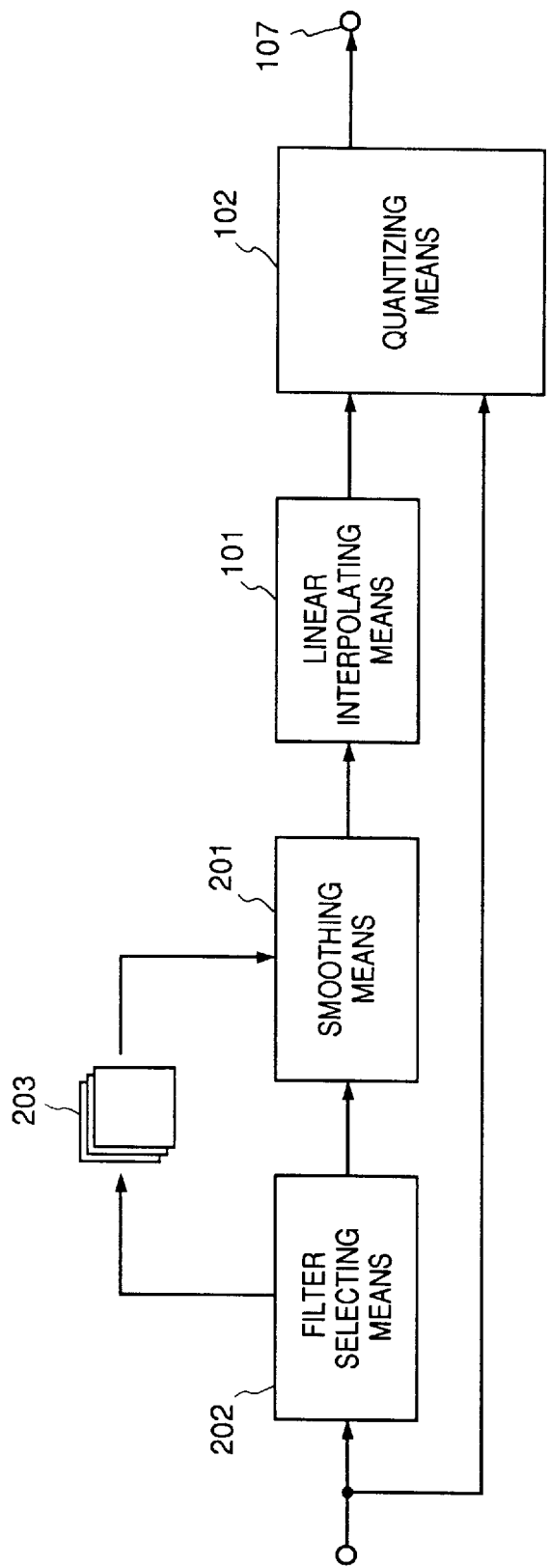

FIG. 17

| 1 | 1 | 1 |
|---|---|---|
| 1 | 8 | 1 |
| 1 | 1 | 1 |

FIG. 18A

| 1 | 0 | 0 |
|---|---|---|
| 0 | 1 | 0 |
| 0 | 0 | 1 |

FIG. 18B

| 0 | 1 | 0 |
|---|---|---|
| 0 | 1 | 0 |
| 0 | 1 | 0 |

FIG. 18C

| 0 | 1 | 1 |
|---|---|---|
| 0 | 1 | 1 |
| 0 | 0 | 0 |

FIG. 18D

| 0 | 1 | 0 |
|---|---|---|
| 0 | 1 | 0 |
| 1 | 1 | 1 |

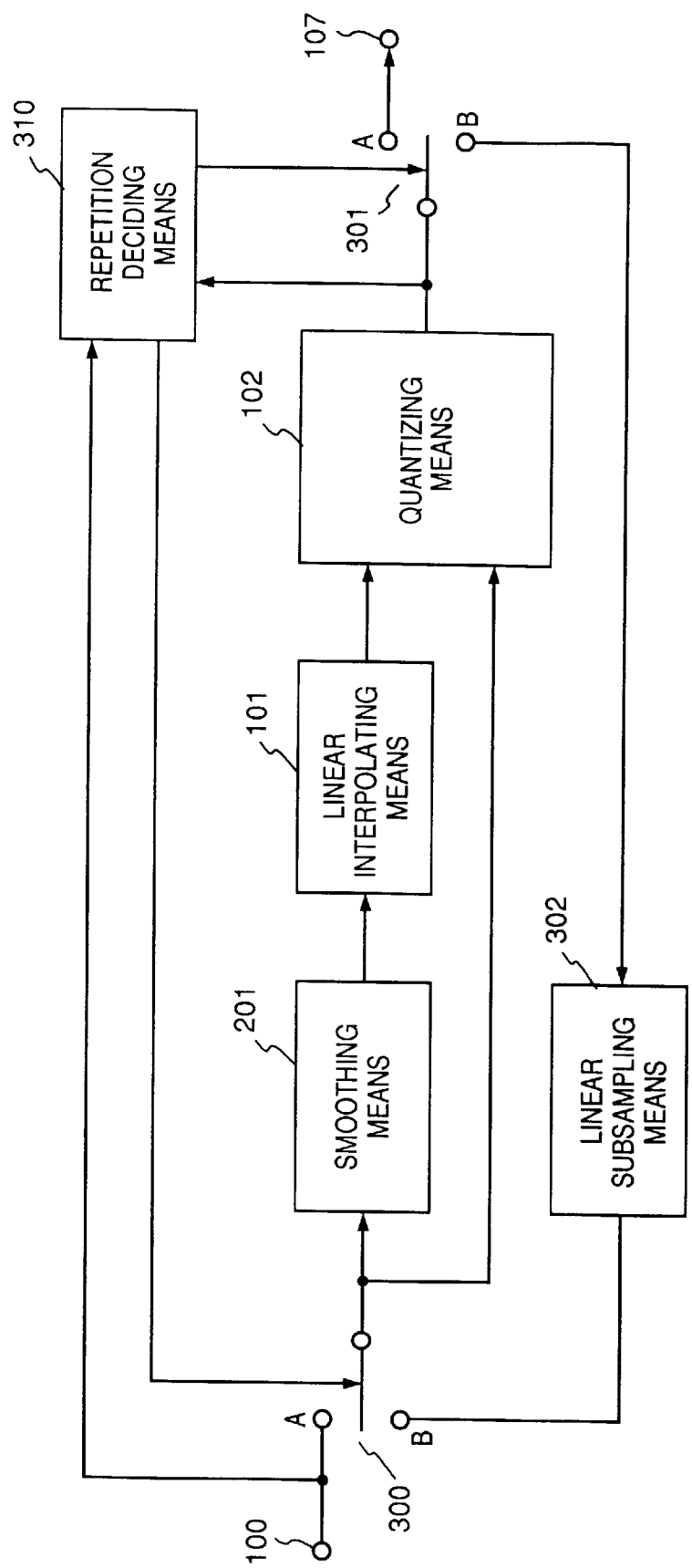

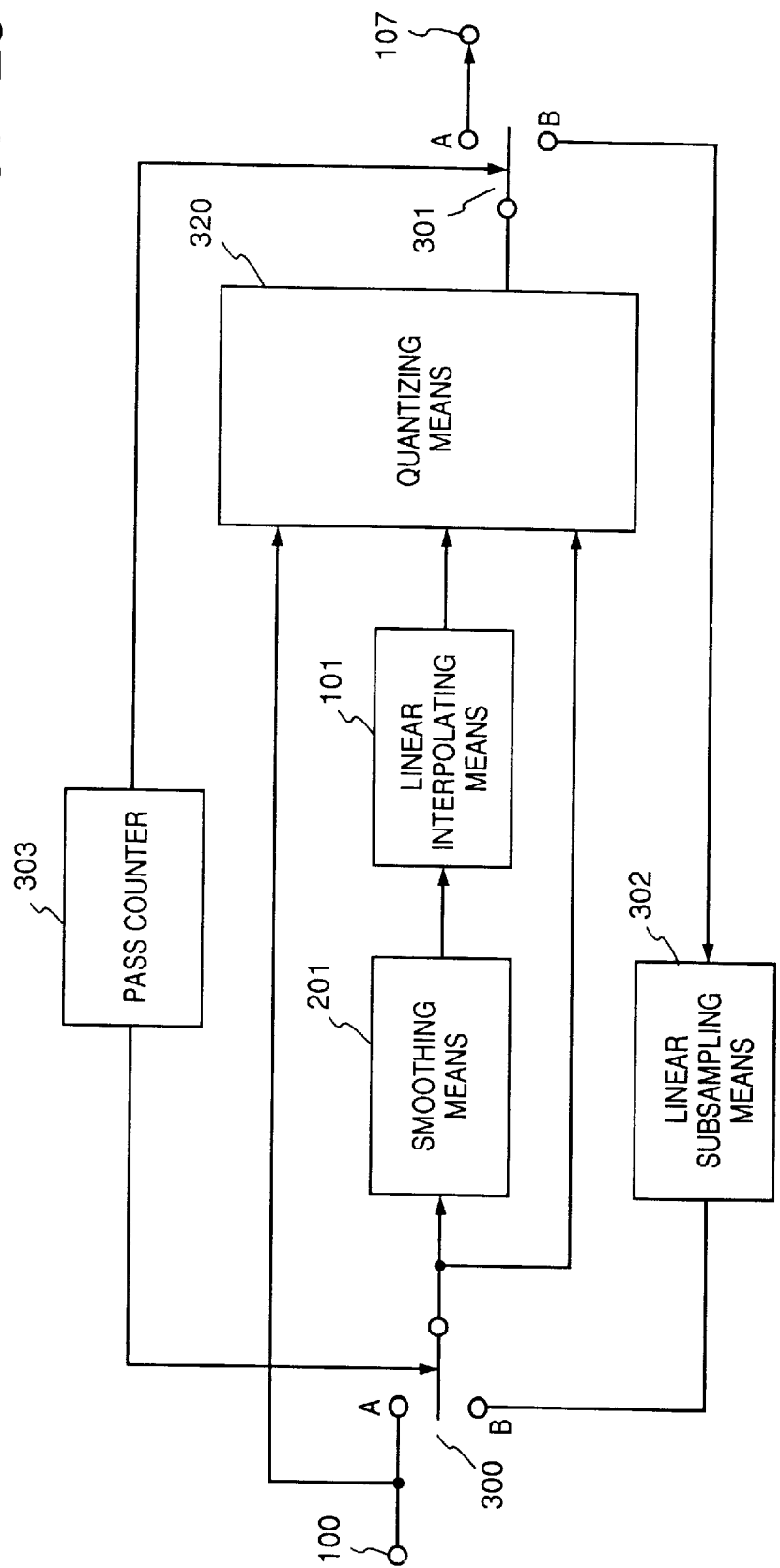

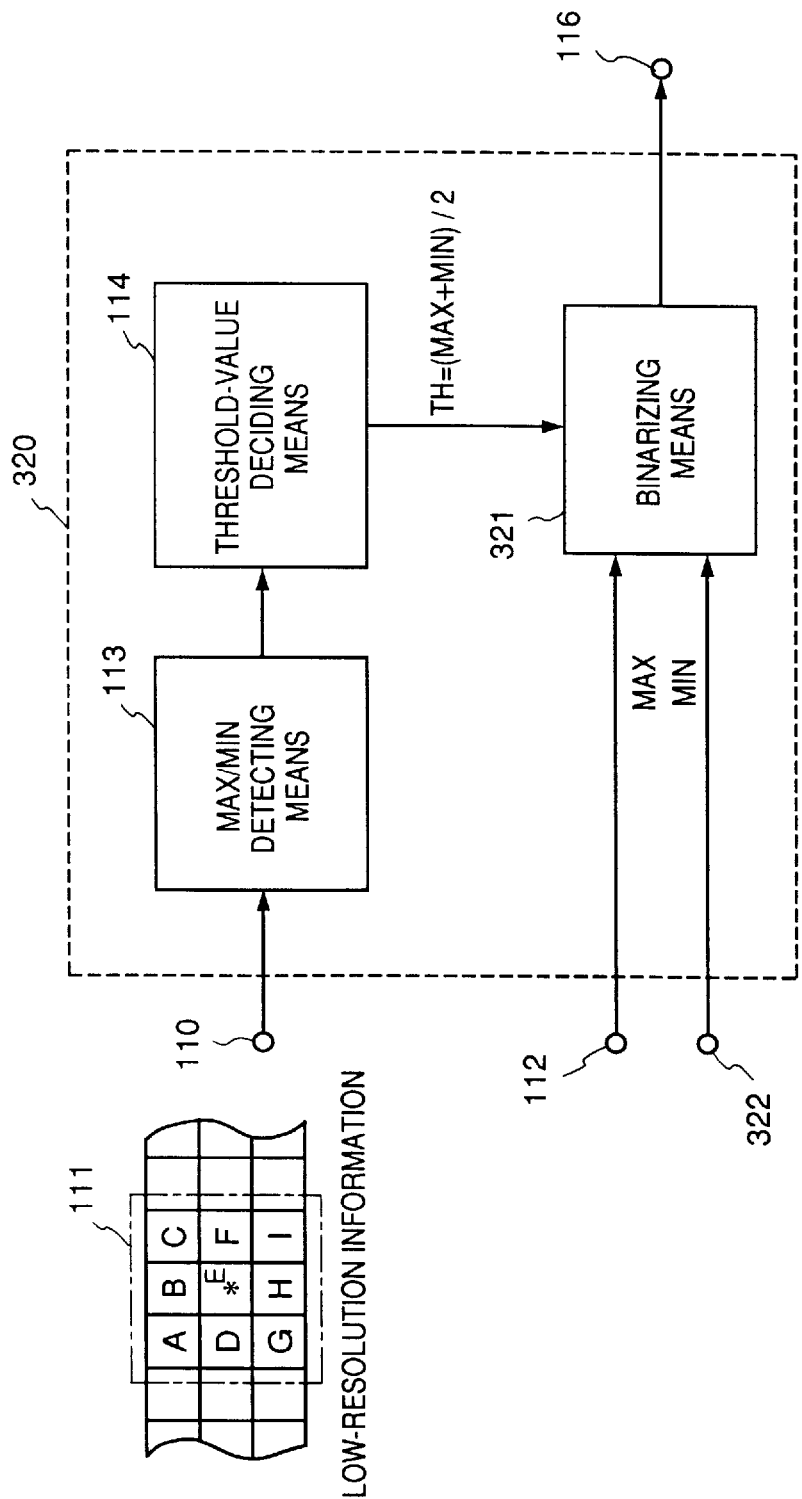

INTERPOLATED POINT E
= $(1-i)(1-j)A + i \cdot (1-j)B + j \cdot (1-i)C + ijD$

INPUT INFORMATION

INFORMATION AFTER RESOLUTION CONVERSION BY
NEAREST NEIGHBOR INTERPOLATION
<2 TIMES × 2 TIMES>

INFORMATION AFTER RESOLUTION CONVERSION BY
BI-LINEAR INTERPOLATION
<2 TIMES × 2 TIMES>

INPUT INFORMATION IN WHICH JAGGIES HAVE
ALREADY BEEN PRODUCED

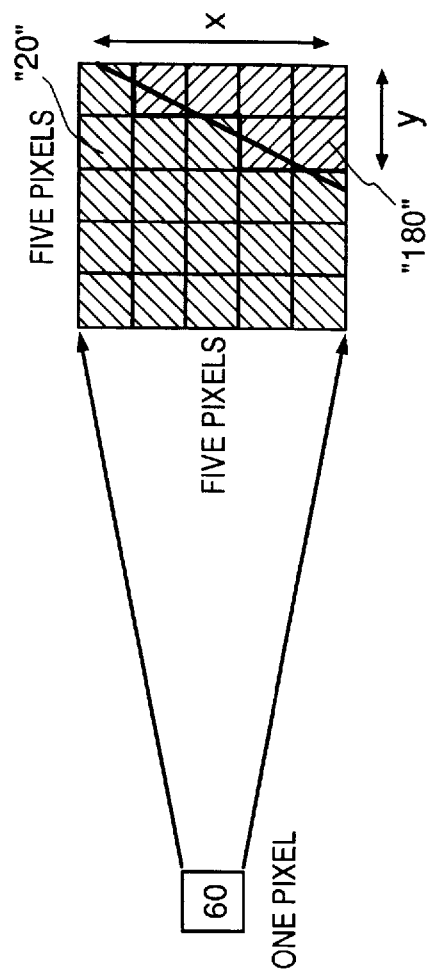

FIG. 39C

FIG. 39B
"180"
x
y
EIGHT PIXELS
EIGHT PIXELS
"40"
100
ONE PIXEL

FIG. 39A
| 40 | 100 | 160 |
| 60 | 100 | 170 |
| 60 | 120 | 180 |

IMAGE PROCESSING WITH LOW-RESOLUTION TO HIGH-RESOLUTION CONVERSION

This application is a continuation of application Ser. No. 08/311,560 filed Sep. 23, 1994, now abandoned.

BACKGROUND OF THE INVENTION

This invention relates to an image processing apparatus and, more particularly, to an image processing apparatus such as one suitable for an image output apparatus such as a printer for outputting input image information upon enlarging the information by zooming, or an apparatus for performing a resolution conversion from low-resolution information to high-resolution information in communication between machine models having different resolutions.

Various methods have been proposed for converting input low-resolution information to high-resolution information. With these proposed conventional methods, however, the methods of conversion processing differ depending upon the type of image dealt with (e.g., a multivalued image having gray-level information for each and every pixel, a two-value image binarized by pseudo-halftones, a two-value image binarized by a fixed threshold value, a character image, etc.).

Methods of interpolation which are conventional methods of converting resolution in multivalued images such as natural pictures having gray-level information for each pixel include nearest neighbor interpolation, as shown in FIG. 25, in which pixel values that are the same as observation points closest to an interpolated point are arrayed, and bi-linear interpolation (linear interpolation), as shown in FIG. 26, in which a pixel value E is decided by calculation (see Equation 1 below) based upon distances of four points (let A, B, C, D represent the pixel values of the four points) that surround the interpolated point.

$$E=(1-i)(1-j)A+i \cdot (1-j)B+j \cdot (1-i)C+ijD \qquad \text{(Eq. 1)}$$

If the distance between pixels is "1", then it is assumed that there is a distance i from A in the horizontal direction and a distance j from A in the vertical direction ($i \leq 1$, $j \leq 1$).

However, the examples of the prior art described above have the shortcomings described below.

Specifically, though the method of FIG. 25 is advantageous in terms of construction, pixel values are decided for each block enlarged in a case where the image dealt with is used in a natural picture or the like. As a consequence, blocks become conspicuous visually, thus resulting in poor picture quality.

In a case where the image dealt with is used in a character, line image or CG (computer graphics), identical pixel values are continuous for each block enlarged. As a result, images such as of slanted lines become poor in quality owing to so-called "jaggies", as shown in FIGS. 27A, 27B. FIGS. 27A–27C are examples of two-fold resolution conversion vertically and horizontally. The greater the magnification, the greater the deterioration in picture quality ("200", "10" in FIGS. 27A–27C are pixel values).

The method of FIG. 26 is generally used in enlarging natural pictures. With this method, an averaged, smoothed image is obtained. However, portions which require edges or sharp quality become blurred. Furthermore, in case of an image obtained by scanning a map or the like or a natural picture which includes characters, there are occasions where important information is not transmitted to the receiving party owing to blurring caused by interpolation.

Figures 27A, 27B, 27C:
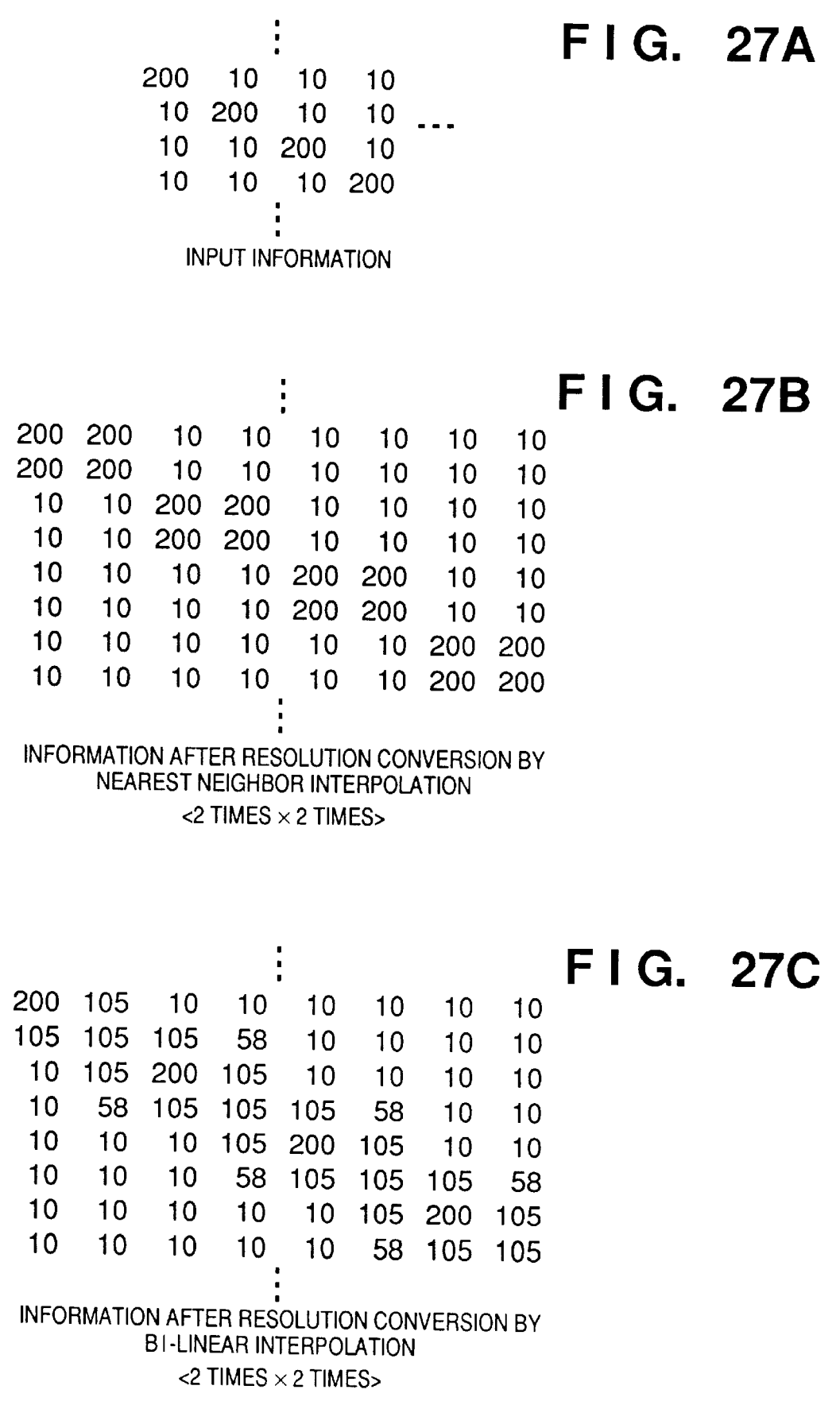

FIG. 27C illustrates image information obtained by applying interpolation processing by a factor of two in each of the horizontal and vertical directions to the image information shown in FIG. 27A by the method of FIG. 26.

FIG. 27C clearly shows that slanted lines themselves and not just the periphery thereof are not averaged in terms of their pixel values and become blurred as a result.

Furthermore, owing to limitations imposed by application software in the host computer, there are cases in which the input low-resolution information already exhibits jaggies due to application of nearest neighbor interpolation processing (see FIG. 28).

Means for eliminating jaggies already occurring in input information, as in the case mentioned above, have not been improved upon in the prior art.

SUMMARY OF THE INVENTION

An object of the present invention is to provide an image processing apparatus in which a low-resolution image can be converted to a high-resolution image with ease and a high-quality image is obtained.

Another object of the present invention is to provide an image processing apparatus in which, when low-resolution information is converted to high-resolution information, interpolative blurring and jaggies are not produced and jaggies that have already been produced are eliminated from an input so that an excellent resolution conversion can be made at any magnification.

A further object of the present invention is to provide an image processing apparatus in which, by using adaptive allocation and addition with created edge information and linearly interpolated information in block units, it is possible to avoid an image with artificial picture tones due to creation of artificial edges especially in the case of a natural picture.

According to the present invention, the foregoing objects are attained by providing an image processing apparatus for converting low-resolution information to high-resolution information and increasing the number of pixels of input image information by a factor of (N×M), comprising interpolating means for interpolating one pixel of low-resolution information to (N×M) pixels, quantizing means for quantizing, to n values ($n \geq 2$), image information within a block of (N×M) pixels after interpolation by the interpolating means corresponding to a low-resolution pixel of interest, and arithmetic means for summing and combining, at a set allocation ratio, information quantized by the quantizing means and interpolated information from the interpolating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A, 5B are examples of binarization according to this embodiment;

FIGS. 7A–7D are diagrams for describing examples of weighting means in FIG. 6;

FIGS. 8A, 8B are diagrams for describing a difference in allocation ratio due to the size of an edge;

FIGS. 10A, 10B are diagrams for describing a difference in the angle of an edge according to the first modification;

FIG. 11 is a block diagram showing a second modification of the first embodiment;

FIG. 13 shows an example of a smoothing filter according to the second embodiment;

FIGS. 14A–14E are examples of processing in the second embodiment;

FIG. 15 is a block diagram showing a modification of the second embodiment;

FIG. 17 shows an example of a smoothing filter illustrated in FIG. 15;

FIGS. 18A–18D are examples of window patterns after binarization in FIG. 16;

FIG. 22 is a block diagram showing a first modification of the third embodiment;

FIG. 23 is a block diagram showing a second modification of the third embodiment;

FIG. 24 is a block diagram of binarizing means according to the second modification;

FIGS. 27A–27C are diagrams showing an example of processing according to the prior art;

FIG. 28 is a diagram showing an example of input image information;

FIGS. 36A, 36B are diagrams showing an example in which a dot arrangement is decided by a ratio;

FIGS. 39A–39C are diagrams showing an example of edge creation in the vertical direction;

DESCRIPTION OF THE PREFERRED EMBODIMENTS

Preferred embodiments of the present invention will now be described in detail with reference to the drawings.

<First Embodiment>

Figure 1:
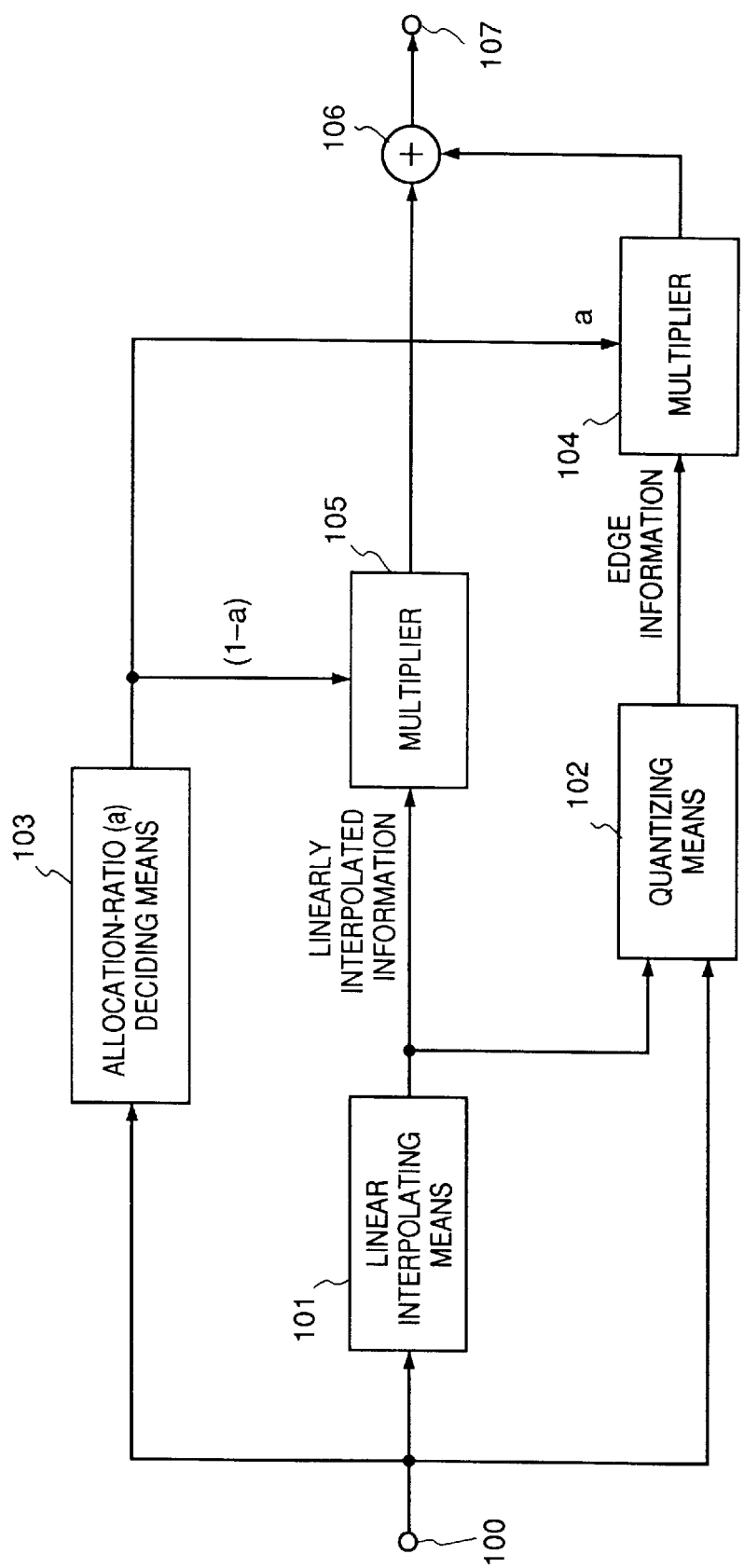
FIG. 1 is a block diagram showing a first embodiment according to the present invention.

FIG. 1 is a block diagram showing a first embodiment of the present invention. Though the image processing apparatus of this embodiment is particularly effective when installed in an image output apparatus such as a printer, it is also possible to be installed as application software in an image processing apparatus other than an image output apparatus, such as in a host computer.

The operating procedure of this embodiment will now be described with reference to FIG. 1. According to this embodiment, input image information is converted to information in which the number of pixels is increased by a factor of N in the vertical direction and M in the horizontal direction (where N, M are integers equal to or greater than two).

Figure 26:
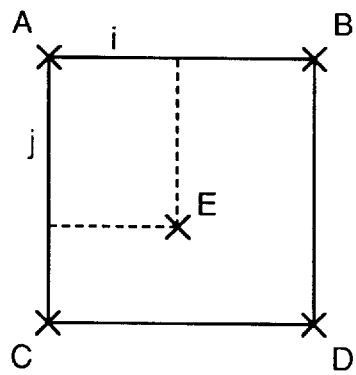
FIG. 26 is a diagram showing bi-linear interpolation according to the prior art.

In FIG. 1, numeral 100 denotes an input terminal from which low-resolution image information enters. This information is sent to linear interpolating means 101. Here pixels between original samplings are filled in by bi-linear interpolation processing (hereinafter referred to as "linear interpolation processing") to create interpolated information increased by a factor of N vertically and M horizontally. This linear interpolation processing is the same as that illustrated in FIG. 26. Numeral 102 denotes quantizing means for quantizing interpolated information of N pixels×M pixels to n values (n≧2) block by block, in which the central pixel is a pixel of interest (denoted by Ixy) of low-resolution information. This corresponds to the creation of an edge for each low-resolution pixel by quantizing the interpolated information. The details of edge creation will be described later. (Information resulting from quantization will be referred to as "edge information" below.)

Numeral 103 denotes allocation-ratio deciding means for calculating an allocation ratio (denoted by "a", where 0≦a≦1) when linearly interpolated information that has been created and edge information are combined. The allocation ratio also is decided in block units of N×M pixels. The decision of allocation ratio will be described later in detail.

A multiplier 104 multiplies the edge information a times using the allocation ratio a obtained, and a multiplier 105 multiplies the linearly interpolated information by (1−a). The products calculated by the multipliers 104, 105 are combined by an adder 106. The result of converting the input image information to the information increased by a factor of N×M is outputted from an output terminal 107.

Figure 2:
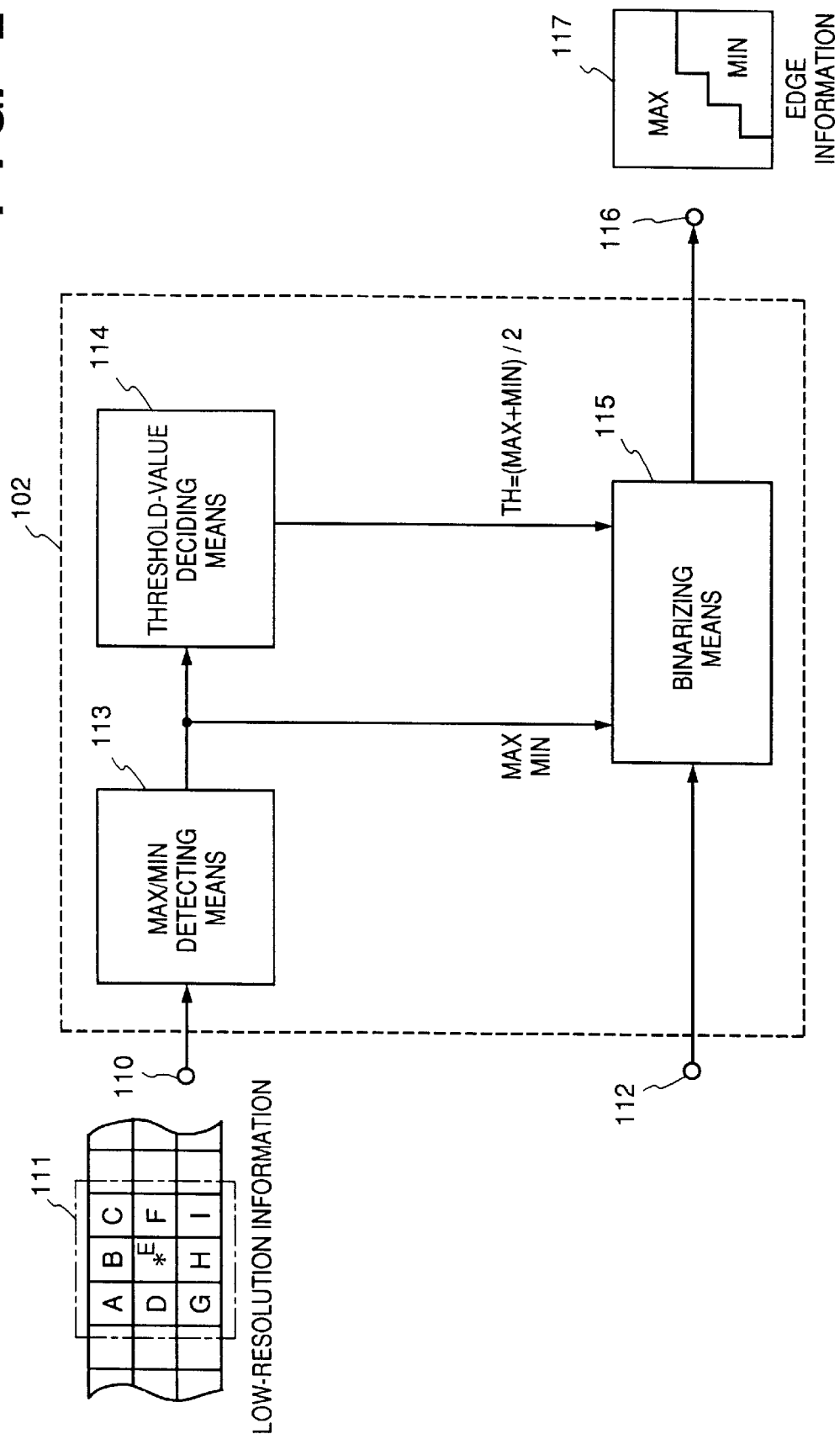
FIG. 2 is a block diagram showing quantizing means illustrated in FIG. 1.

FIG. 2 is a diagram showing the details of the quantizing means 102 illustrated in FIG. 1. In this embodiment, binarization (n=2) is described as an example of quantization. The components enclosed by the dashed line in FIG. 2 correspond to the quantizing means.

Figure 3:
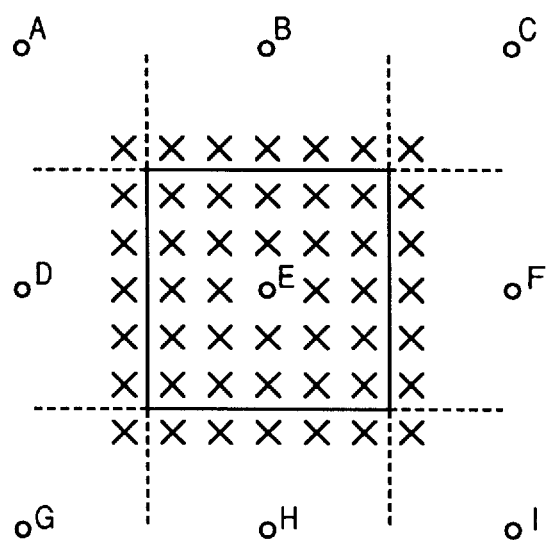
FIG. 3 is a diagram for describing linear interpolation according to this embodiment.

Numeral 110 in FIG. 2 denotes an input terminal for low-resolution information. The input information is indicated at 111, in which the pixel E corresponds to the pixel of interest and the portion enclosed by the one-dot chain line is a window of pixels neighboring the pixel of interest. (This is a referential window having the size of a referential area peripheral to the pixel of interest.) Numeral 112 denotes an input terminal to which the signal from the linear interpolating means is applied. The information which enters from this terminal is shown in FIG. 3. This is for an example in which N=M=5 holds.

In FIG. 3, the dashed lines indicate the boundaries of blocks centered on each low-resolution pixel. The portion enclosed by the solid line is a block (hereinafter referred to as a "pixel-of-interest block") regarding a pixel E of interest. The circle marks indicate pixels (observation pixels) of low-resolution information, and the "X" marks indicate interpolated pixels. That is, the low-resolution pixel E is considered to correspond to 5×5 or 25 pixels by interpolation.

The low-resolution information which has entered from the input terminal 110 is applied to MAX/MIN detecting means 113, which detects a maximum value (MAX) and a minimum value (MIN) within the window. The detected MAX and MIN information is sent to threshold-value deciding means 114, which decides a threshold value for binarization to a binary value. In this embodiment, the threshold value (hereinafter denoted by "TH") is decided by the following equation:

$$TH=(MAX+MIN)/2 \quad \text{(Eq. 3)}$$

The items of decided threshold-value information and MAX, MIN information are sent to binarizing means 115, which binarizes the interpolated information (within the pixel-of-interest block) of the block centered on the pixel E of interest that has been subjected to linear interpolation. This information enters from the input terminal 112. A MAX value is allocated to interpolated pixels larger than the binarization threshold value, and a MIN value is allocated to interpolated pixels smaller than the threshold value. Edge information of a block in which representatives of binarization indicated at 117 are allocated by MAX, MIN is outputted from an output terminal 116.

Figure 4A:
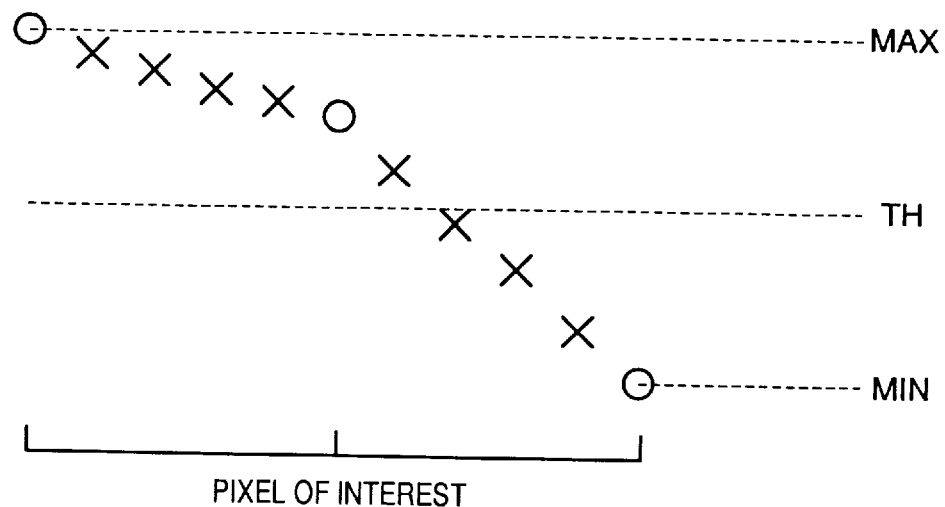
FIGS. 4A, 4B are diagrams for describing linear interpolation and binarization according to this embodiment.
Figure 4B:
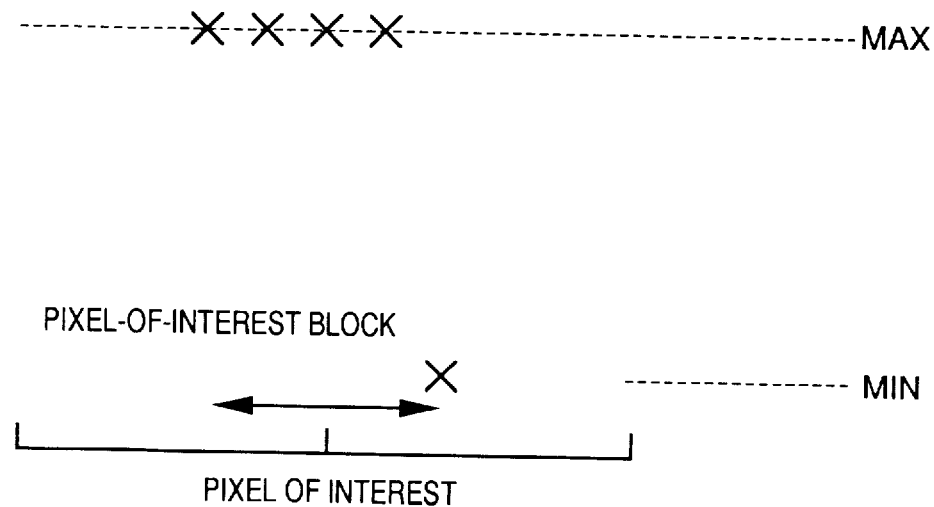

FIGS. 4A, 4B illustrate linear interpolation and the manner in which edge creation is performed. This is illustrated along a direction in one dimension in order to simplify the description. The circle marks indicate pixel values of sampling points in terms of low resolution, and the x marks indicate pixel values of interpolated points interpolated between the above-mentioned pixel values. The point indicated by the circle mark situated at the central position is the pixel of interest.

As shown in FIG. 4A, MAX, MIN values are detected from the adjacent pixels and the threshold value TH is calculated in accordance with the above-mentioned equation. If we assume that an enlarged pixel block centered on the pixel of interest is composed of five pixels, then, as shown in FIG. 4B, four pixels will be greater than TH and therefore will take on the MAX value, and one pixel will be less than TH and will take on the MIN value.

FIGS. 5A, 5B illustrate an example in which edge information is created. Assume here that the pixel of interest of the low-resolution information has a pixel value of "80" placed at the center, as shown in FIG. 5A. One pixel of this pixel of interest is interpolated by a factor of N vertically and M horizontally, as shown in FIG. 5B, and an edge is created by performing binarization at a MAX value of "200", a MIN value of "20" and a binarization threshold value (200+20)/2=110 within the window.

By virtue of the edge creation processing described above, it is possible for pixels which touch an edge portion in a low-resolution image to create a smooth edge, namely high-resolution information, in the resolution direction within the enlarged block.

Figure 6:
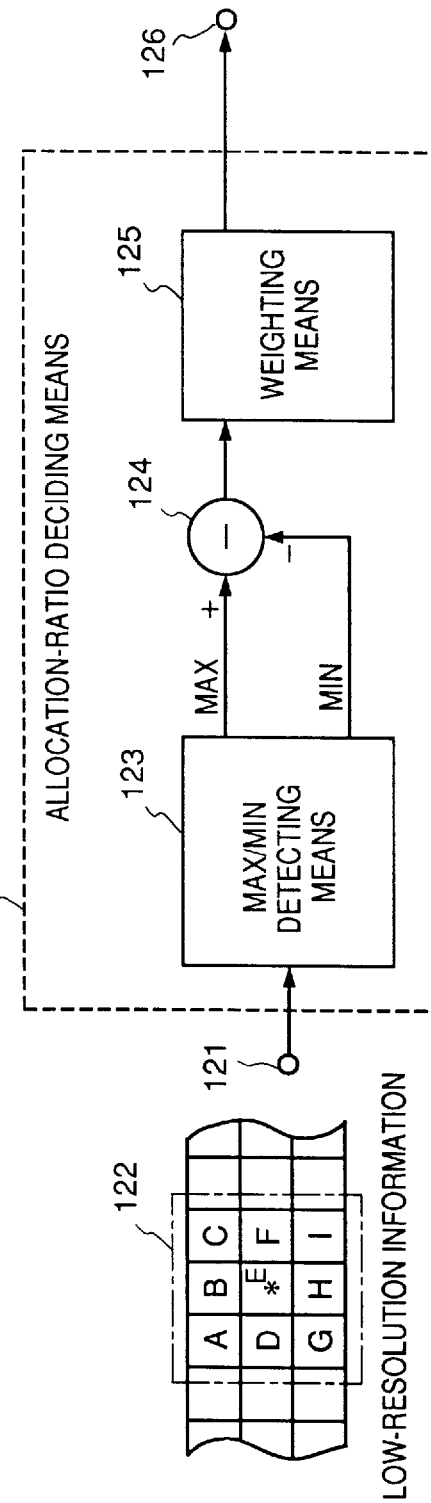
FIG. 6 is a diagram showing the detailed construction of allocation-ratio deciding means illustrated in FIG. 1.

FIG. 6 illustrates the allocation-ratio deciding means. The portion enclosed by the dashed line corresponds to the allocation-ratio deciding means indicated at 103 in FIG. 1. The allocation-ratio deciding means has an input terminal 121 from which the low-resolution information indicated at 122 enters. The pixel E is adopted as the pixel of interest, as described in connection with FIG. 2. As in the manner of the edge creating means of FIG. 2, MAX and MIN values within the window are detected by MAX/MIN detecting means 123. The detecting means within the edge creating means naturally can be used as the MAX/MIN detecting means 123.

Numeral 124 denotes a subtractor for performing a (MIN−MAX) operation. That is, this operation corresponds to obtaining the dynamic range within the window.

Numeral 125 denotes weighting means provided in order to decide whether the created edge information should be given more emphasis or less emphasis. The weighting may be obtained experimentally in order to be optimized for the system. Alternatively, the weighting may be decided in conformity with the image being handled.

FIGS. 7A–7D, which illustrate examples of weighting, show how the allocation ratio a is calculated based upon dynamic range within the window. The greater the dynamic range, the more the weight (coefficient a) of the created edge information increases. However, various weightings are conceivable, such as linear weighting [FIG. 7A], non-linear weighting [FIG. 7B], clipped weighting [FIG. 7C] and weighting set in steps [FIG. 7D]. These may be found by calculation. Complicated weightings may be realized by an LUT (look-up table). The allocation ratio a thus obtained is outputted from the output terminal 126 (shown in FIG. 6) and supervises the allocation and addition of edge information and linearly interpolated information.

FIGS. 8A, 8B illustrate the effects of combining edge information and linearly interpolated information based upon the allocation ratio. More specifically, the created edge information is multiplied by a factor of a, the linearly interpolated information is multiplied by a factor of (1−a) and the results are combined to create a smooth edge of the kind shown. Moreover, since the dynamic range, i.e., the degree of edge size, is made an evaluation function, processing can be executed in which the steeper the edge, the greater the dependence of the created edge information [see FIG. 8A]. Further, since the flatter a portion is the greater the dependence of linearly interpolated information, the created edge has no deleterious effects [see FIG. 8B].

In accordance with this embodiment as described above, blurring due to interpolation, which was a problem particularly in the case of a natural picture, and jaggies which were a problem particularly in the case of characters and line images, do not occur when input low-resolution information is converted to high-resolution information. This makes it possible to realize conversion processing with excellent picture quality.

Further, by adaptively changing the allocation ratio of linearly interpolated information and created edge information, non-linearity of edge size and edge shape is changed with ease. In particular, in a case where an input is a natural picture, it is possible to avoid image of artificial picture tones due to creation of artificial edges.

<First Modification of First Embodiment>

A first modification of the first embodiment will now be described in detail. In the first modification, the allocation-ratio deciding means, namely the evaluation function which decides the allocation ratio, differs from that of the first embodiment.

Figure 9:
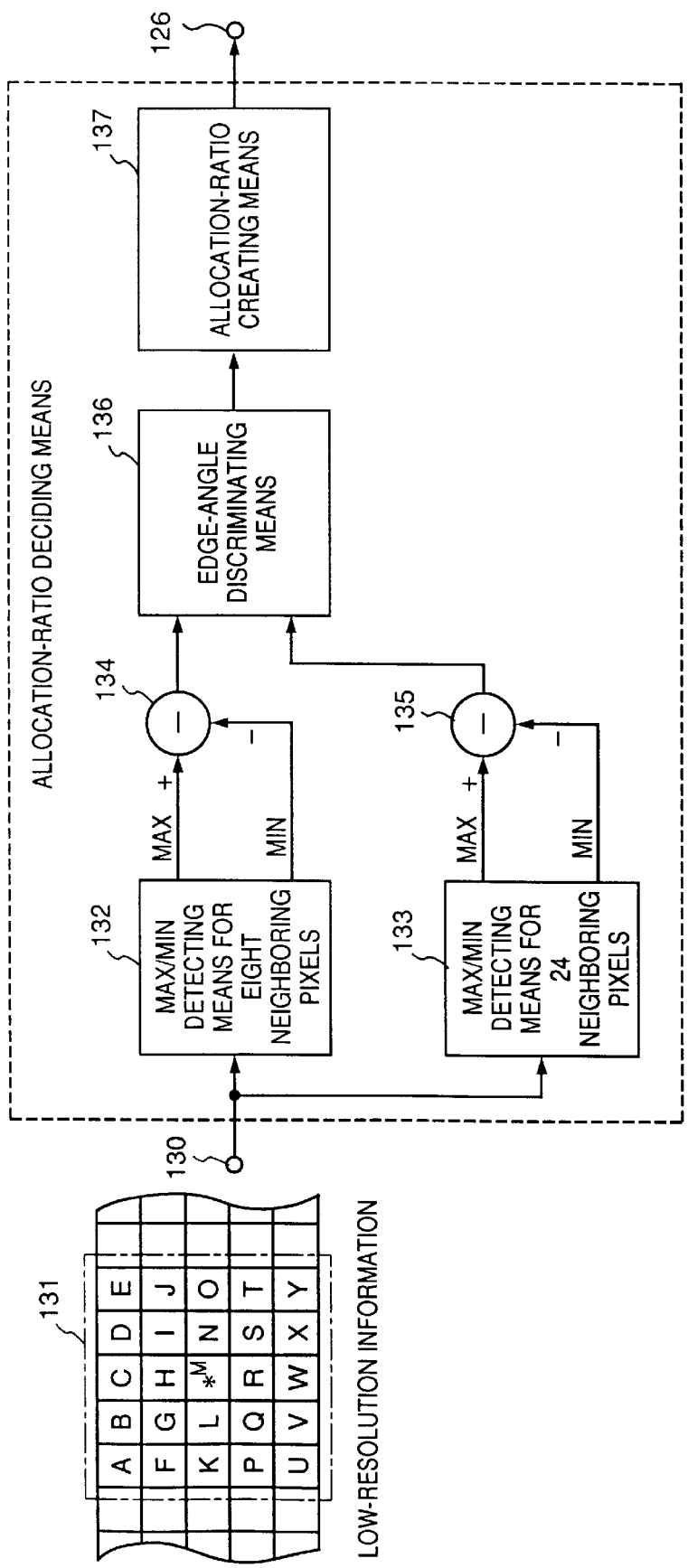
FIG. 9 is a diagram of allocation-ratio deciding means according to a first modification of the first embodiment.

FIG. 9, which is a block diagram showing the first modification, illustrates allocation-ratio deciding means. The portion enclosed by the dashed line in FIG. 9 is the allocation-ratio deciding means, just as in FIG. 6. Elements identical with those shown in FIG. 6 are designated by like reference characters and need not be described again.

Numeral 130 denotes an input terminal from which low-resolution information indicated at 131 enters. The low-resolution information 131 includes a pixel of interest M. The eight surrounding pixels enclosed by the bold line are referred to as "eight neighboring pixels" and the peripheral pixels enclosed by the one-dot chain line are referred to as "24 neighboring pixels". Numeral 132 denotes MAX/MIN detecting means for the eight neighboring pixels, and 133 MAX/MIN detecting means for the 24 neighboring pixels. The MAX and MIN detected by MAX/MIN detecting means for eight neighboring pixels 132 are applied to a subtractor 134 which obtains the difference between them, and MAX and MIN detected by detecting means 133 are applied to a subtractor 135 which obtains the difference between them. This processing corresponds to obtaining the dynamic range in the eight neighboring pixels and the dynamic range in the 24 neighboring pixels which include the above-mentioned eight pixels. On the basis of the dynamic ranges obtained, edge-angle discriminating means 136 discriminates how steep an edge is. The manner in which this is performed is illustrated in FIGS. 10A, 10B.

The circle marks in FIGS. 10A, 10B indicate pixel values of sampling points at low resolution, and the x marks indicate interpolated values interpolated between the above-mentioned pixels. This is illustrated along a direction in one dimension in order to simplify the description. The point indicated by the circle mark situated at the central position is the pixel of interest. The pixels adjacent thereof on both sides are the eight neighboring pixels, and the pixels on the outside of these are the 24 neighboring pixels. FIG. 10A illustrates a case in which the difference between the dynamic range of the eight neighboring pixels and the dynamic range of the 24 neighboring pixels is small, and FIG. 10B shows a case in which this difference is large.

Returning to FIG. 9, the rough angle of an edge enclosing the pixel of interest is judged by the edge-angle discriminating means 136 based upon the two types of dynamic range information, and the edge-angle discriminating means 136 transmits a signal indicative of the judged angle to allocation-ratio creating means 137. This signal may be the difference between the two dynamic ranges. Alternatively, the correlation can be evaluated even if the signal is a ratio of the two types of dynamic range.

The allocation-ratio creating means 137 decides the allocation ratio in such a manner that the allocation ratio of the created edge information is enlarged if the edge angle is large and reduced if the edge angle is small. The allocation ratio decided is delivered from the output terminal 126. This signal is applied to the multipliers 104, 105 just as in the first embodiment illustrated in FIG. 1.

In accordance with this modification as described above, by adaptively changing the allocation ratio of linearly interpolated information and created edge information, non-linearity of edge size and edge shape is changed with ease. In particular, in a case where an input is a natural picture, it is possible to avoid image of artificial picture tones due to creation of artificial edges.

<Second Modification of First Embodiment>

FIG. 11 is a block diagram illustrating a second modification of the first embodiment. According to the second modification, window creating means 108 is added to the arrangement of the first embodiment illustrated in FIG. 1. That is, this modification is so adapted that it is possible to vary the window used in calculating MAX, MIN in edge creation in the quantizing means 102.

There are cases in which the peak of an edge may not always be detected solely by a window of eight neighboring pixels. Accordingly, in the second embodiment, the window creating means 108 adaptively creates a window that encompasses the peaks of edges based upon the circumstances of the peripheral pixel values, and the MAX and MIN in the window created by the window creating means 108 are used in the creation of the threshold value TH. As a result, a window encompassing the peaks of edges can be created so that the peak of an edge can be detected reliably.

It is possible to adopt an arrangement in which MAX and MIN in the window created by the window creating means 108 are supplied to the allocation-ratio deciding means 103 so as to be used in deciding the allocation ratio.

In the first embodiment described above, the size of the window for calculating the threshold value and allocation ratio may be set in advance to eight neighboring pixels or 24 neighboring pixels and so on, depending upon the type of input image.

Further, an arrangement may be adopted in which the allocation ratio can be changed depending upon the type of input image or the preference of the user.

Further, though it is described that binarization using a threshold value is adopted for edge creation, it goes without saying that other methods may be employed.

Further, binarization (n=2) is described as an example of quantization. However, a representative of quantization and a threshold value may similarly be set from a window of peripheral pixels, and the interior of the pixel-of-interest block after interpolation processing may be converted to multiple values greater than two values. Operation based upon multiple values makes it possible to reduce a steep edge.

In order to facilitate an understanding of the invention, the creation of a binarized edge image, the creation of linearly interpolated information and the combining of these two types of information have been described independently thus far. In actual processing, however, it is obvious that the calculations can be performed simultaneously based upon the information after linear interpolation processing. That is, $$\text{Levelout} = a \times \text{MAX} + (1-a) \times \text{Levelin}$$

is calculated for pixels greater than the threshold value TH and $$\text{Levelout} = a \times \text{MIN} + (1-a) \times \text{Levelin}$$

is calculated for pixels less than value TH at the same time. [Levelin represents each pixel value after linear interpolation, Levelout the output value of the same pixel position, and a the allocation ratio ($0 \leq a \leq 1$)].

In accordance with the first embodiment as described above, edge information is created by estimation from the input low-resolution information, and the created edge information is then added on. This makes it possible to create high-resolution information having sharp edges without visual blurring. Further, by adaptively changing the allocation ratio of linearly interpolated information and created edge information, non-linearity of edge size and edge shape is changed with ease. In particular, in a case where an input is a natural picture, it is possible to avoid image of artificial picture tones due to creation of artificial edges.

<Second Embodiment>

Figure 12:
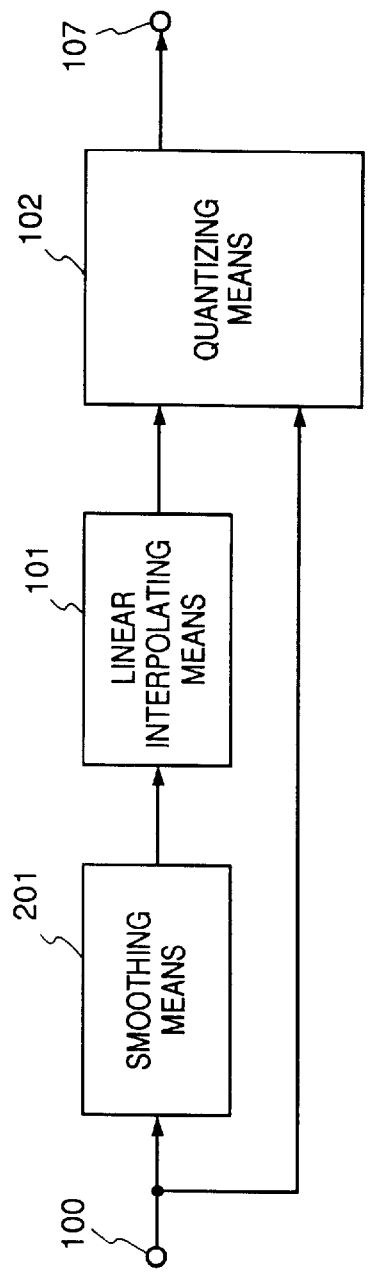
FIG. 12 is a block diagram showing a second embodiment according to the present invention.

FIG. 12 is a block diagram illustrating a second embodiment of the present invention.

Figure 13:
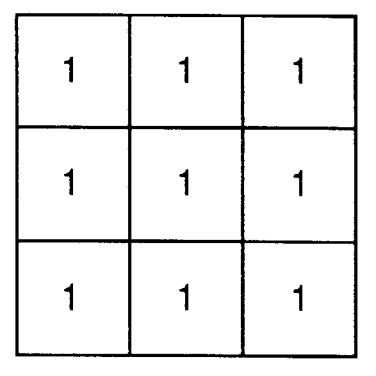

Low-resolution image information enters from the input terminal 100 and is applied to smoothing means 201. FIG. 13 illustrates an example of a smoothing filter used in the second embodiment. It goes without saying that other smoothing filters may also be used. The image information smoothened by the smoothing means 201 is sent to the linear interpolating means 101, where the smoothened image information is interpolated by a factor of N vertically and M horizontally.

The interpolated information is transmitted to the quantizing means 102, which performs edge creation in a pixel-of-interest block in which the number of pixels has been increased, just as in the embodiment described above. This operation destroys the edge of the original information (low-resolution information) and creates a new edge (high-resolution information) in a state in which the number of pixels has been increased. As a result, an edge having jaggies dependent upon the original information is not produced.

The processing of the second embodiment will be described based on actual values with reference to FIGS. 14A–14E.

Figures 14A, 14B, 14C, 14D, 14E:
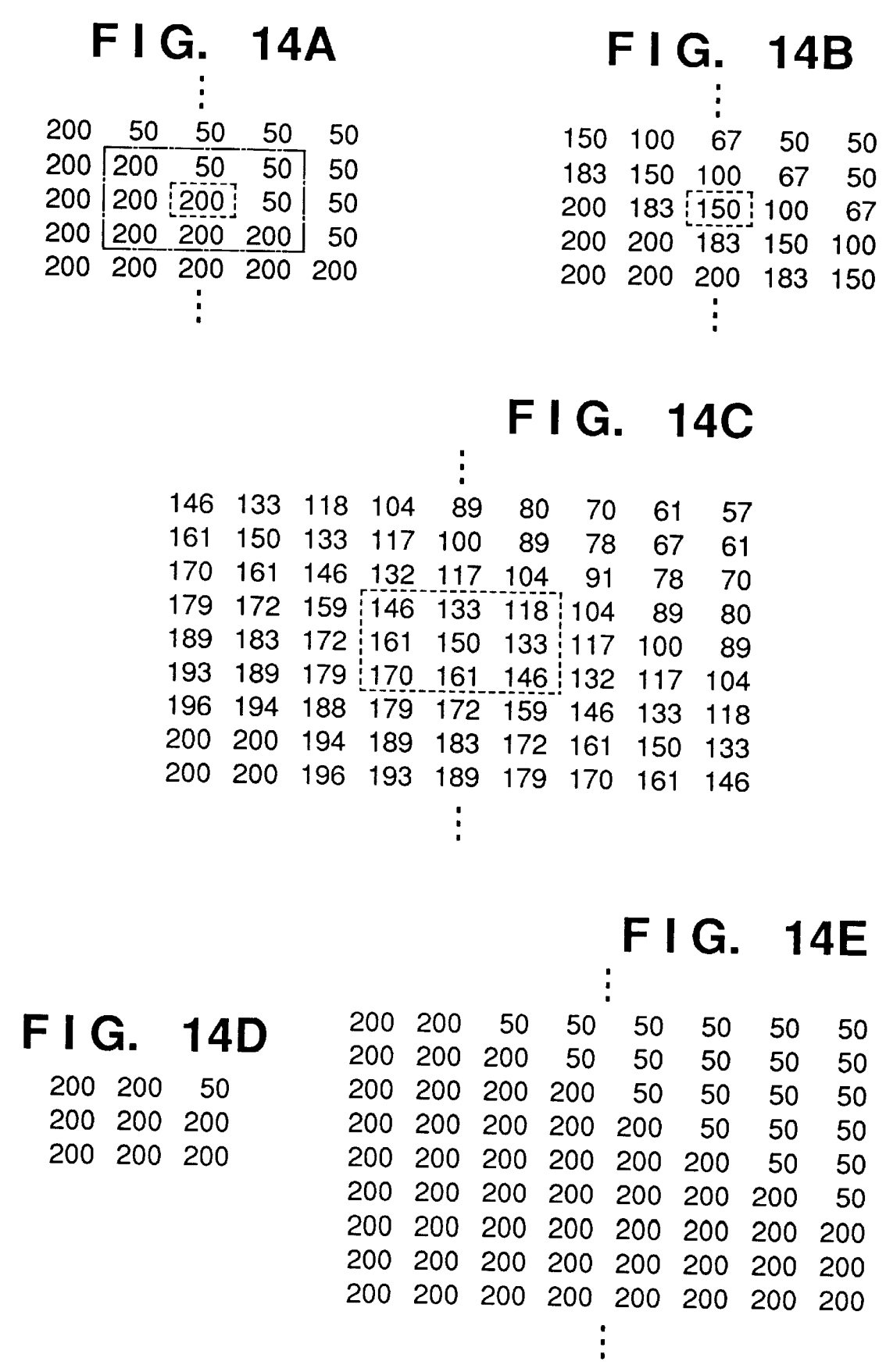

FIG. 14A shows a portion of a certain input image. The pixel enclosed by the dashed line is the pixel of interest, and the portion enclosed by the one-dot chain line serves as a window. FIG. 14B illustrates pixel values of a portion the same as that of FIG. 14A after smoothing. Since the pixel of interest enclosed by the dashed line is smoothened, "200" is converted to a value "150".

FIG. 14C illustrates pixel values after linear interpolation in the vicinity of the pixel of interest. Here M=N=3 holds, with one pixel portion being increased to nine pixels. The interior of the pixel-of-interest block is quantized to two values. Since MAX=200, MIN=50 from the window of FIG. 14A, the value of pixels is binarized by the binarization threshold value (TH=125) calculated by Eq. 3, the MAX value is substituted for pixels greater than TH and the MIN value is substituted for pixels less than TH. The results are shown in FIG. 14D. FIG. 14E illustrates final results after similar processing is applied to other pixels of interest as well. As is evident from this example, an excellent resolution conversion can be realized at any magnification without producing jaggies.

<Modification of Second Embodiment>

FIG. 15 is a block diagram showing a modification of the second embodiment, in which elements identical with those of the second embodiment are designated by like reference characters.

Numeral 202 denotes filter selecting means for adaptively selecting which filter is to be used as the smoothing filter based upon the input image. For example, if filtering processing were to be executed by the smoothing filter shown in FIG. 13, edges would collect together at complicated portions where there are a plurality of edges or lines would become discontinuous or vanish at portions where lines are slender. In order to solve these problems in the second embodiment, filters are changed over depending upon the pattern within the window of the input image.

Figure 16:
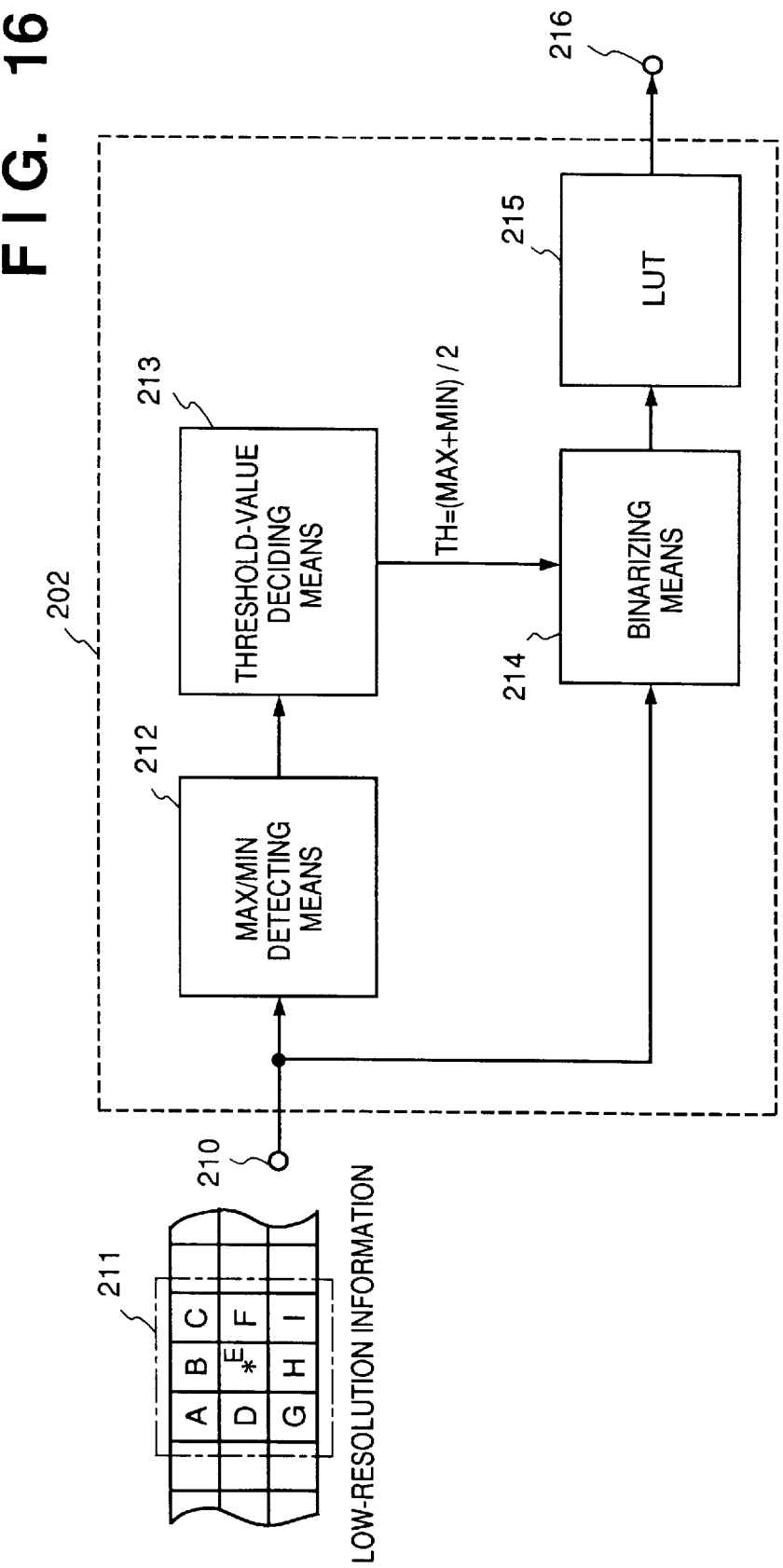
FIG. 16 is a diagram showing the detailed construction of filter selecting means illustrated in FIG. 15.

As shown in FIG. 15, the filter selecting means is provided in front of the smoothing means 201 and decides which filter among a filter group 203 should be used. An example of the filter selecting means is illustrated in FIG. 16. Numeral 210 denotes input means for entering pixel information within a window surrounding the pixel of interest shown indicated at 211. Numeral 212 denotes MAX/MIN detecting means for detecting maximum and minimum values within the window. Threshold-value deciding means 213 calculates the threshold value TH from the values of MAX and MIN. Binarizing means 214 binarizes not only the pixel of interest but also each pixel within the window. For example, if the window is as shown at 211, nine pixels (A–I) within the window are binarized. The binarized, nine-bit window information is sent to a LUT (look-up table) 215, where by optimum filter is selected. The output of the LUT 215 is delivered from an output terminal 216.

Figure 17:
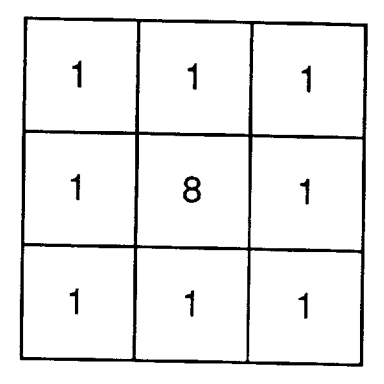

Patterns in which problems are caused by smoothing are found experimentally in advance and are set in the LUT 215 in such a manner that a filter which weights the pixel of interest is selected, as shown in FIG. 17. Patterns may also be set to pass through the filter.

FIGS. 18A–18D illustrate typical patterns which may cause problems with use of the filter shown in FIG. 13. FIGS. 18A, 18B show patterns of slender lines, in which there is a possibility that the slender lines will be cut by smoothing. FIGS. 18C, 18D show patterns corresponding to corner portions, in which there is the possibility that the corners will be rounded by smoothing. According to this modification, such patterns are set in the LUT in advance, as a result of which an adaptive filter can be selected. This prevents the above-mentioned problems and makes it possible to process only portions which may produce jaggies.

It goes without saying that the MAX/MIN detecting means, threshold-value deciding means and binarizing means shown in FIG. 16 can be shared by the quantizing means (the arrangement of FIG. 2) shown in FIG. 15. Storing the results of calculating the MAX value, MIN value and threshold value provides good efficiency.

In this modification, filters are changed over by a two-valued pattern within the window. However, the complexity of an edge at the periphery of a pixel of interest can be made an evaluation function and the changeover of filters can be supervised by calculation.

<Third Embodiment>

Figure 19:
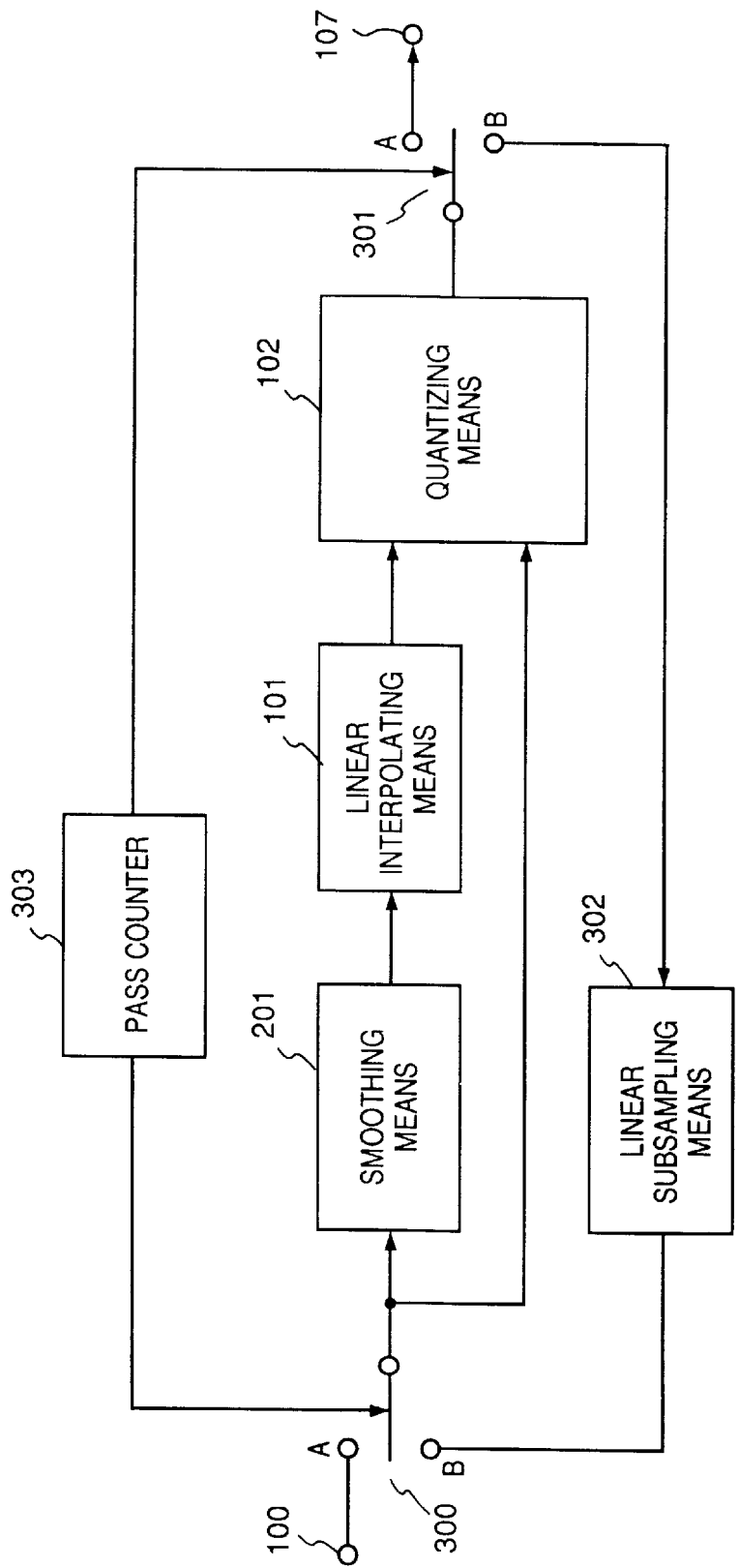
FIG. 19 is a block diagram showing a third embodiment according to the present invention.

FIG. 19 is a block diagram showing a third embodiment according to the present invention. This embodiment is particularly effective for image information already having jaggies owing to device limitations upon image input or limitations imposed by application software used to create the image. Here a switch 300 is initially connected to a terminal A so that the input image information is sent to the smoothing means 201. The smoothened image information is sent to the linear interpolating means 101, after which the interpolated information is quantized by the quantizing means 102 to create an edge in enlarged information.

Figure 20:
FIG. 20 is a diagram for describing linear thinning-out processing according to the third embodiment.

The created edge information is connected to a terminal B by a switch 301, which sends the information to linear subsampling means 302. The method of linear subsampling processing is shown in FIG. 20, which is a one-dimensional illustration for the sake of simplifying the description. The circle marks indicate pixels of high-resolution information in which an edge has been created, and the x marks indicate linearly subsampled pixels. FIG. 20 shows an example in which pixels are subsampled to ½. In this embodiment, subsampling processing is executed so as to become the same as the resolution of the image (number of pixels) which entered at the input terminal 100 of FIG. 19.

When subsampling processing is executed and resolution becomes the same as that of the input image, the switch 300 is connected to terminal B so that the same operation is performed again. Control of the switches 300, 301 is administered by a pass counter 303. The loop of smoothing, edge creation and subsampling processing is executed a number of times equivalent to the number of passes, which is set in advance. When this processing is repeated the set number of passes, the switch 301 is connected to terminal A so that the enlarged image information is outputted to the output terminal 107. By virtue of this series of repetitive processing operations, already existing jaggies are smoothened. Since the creation of new edges is repeated, it is possible to convert jaggies to smooth curves. Moreover, since edges are created, blurred images resulting from interpolation processing are not produced.

Figure 21A:
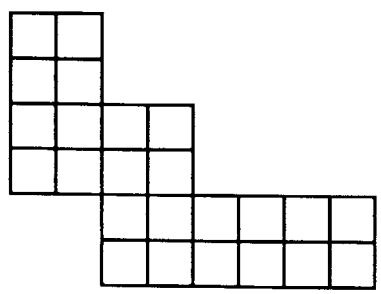
FIGS. 21A, 21B are diagrams for describing the effects of the third embodiment.
Figure 21B:
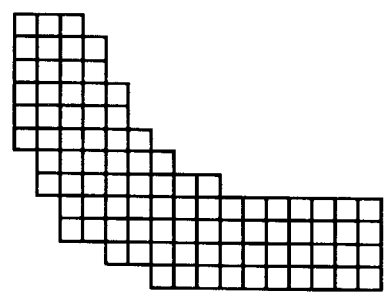
Figure 25:
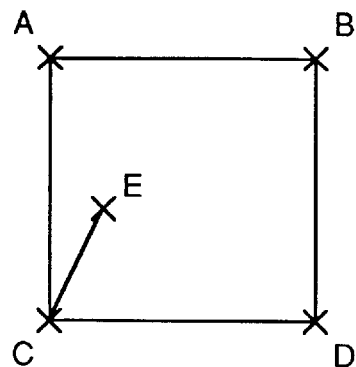
FIG. 25 is a diagram showing nearest neighbor interpolation according to the prior art.

FIGS. 21A, 21B illustrate an example of processed results according to the third embodiment. Here a line image in which an image has been created by application software in a host computer is assumed to be entered.

In order to facilitate the description, a unit grid surrounded by a square is assumed to be one pixel. Jaggies are already being produced from the input low-resolution image in FIG. 21A.

FIG. 21B illustrates results of processing obtained by repeating the smoothing and edge creation processing of the third embodiment. The reason why the unit grid is smaller than FIG. 21A is because a conversion has been made to high resolution.

In accordance with the third embodiment as described above, jaggies produced from the original information are made a smooth curve by repetitive processing.

<First Modification of Third Embodiment>

FIG. 22 is a block diagram showing a first modification of the third embodiment. Elements identical with those of the third embodiment are designated by like reference characters. The first modification differs from the third embodiment in the control of the number of repetitions of the loop. In FIG. 22, numeral 310 denotes repetition deciding means which receives inputs of two types of image information, namely the original image information which enters from the input terminal 100 and interpolated image information obtained by edge creation and enlargement.

The repetition deciding means 310 compares image information by nearest neighbor interpolation in which pixel values that are the same as observation points closest to an interpolated point are arranged, and image information in which an edge has been created, judges whether jaggies have been removed sufficiently and controls the changeover of the switches 300, 301. In other words, the switches 300, 301 are connected to their B terminals to execute repetitive processing as long as jaggies have not been eliminated.

In a case where it has been judged that jaggies have been eliminated, the switch 301 is connected to terminal A to deliver the processed image to the output terminal 107. As an example of judgment, whether error power between the image information by nearest neighbor interpolation and the created-edge information is greater than a certain set threshold value may be made a judgment evaluation function.

In accordance with the first modification as described above, smoothing, enlarging and edge creation and subsampling are repeated, just as in the third embodiment, thereby reducing jaggies and forming a smooth curve instead. In the end an excellent image is outputted.

<Second Modification of Third Embodiment>

FIG. 23 is a block diagram showing a second modification of the third embodiment. Elements identical with those of the third embodiment shown in FIG. 19 are designated by like reference characters. This modification differs from the third embodiment in part of the quantizing means 320. FIG. 24 illustrates the principal features of the quantizing means 320 according to the second modification. This differs from quantizing means 102 of FIG. 2 only in that the MAX, MIN information, namely the quantization representatives in binarizing means 321, is externally applied. The two quantizing means are the same in other respects. (The portion enclosed by the dashed line is the quantizing means 320.) More specifically, in the embodiment shown in FIG. 19, the density of the original image is averaged by the linear subsampling means, as a result of which the dynamic range is reduced. There is the danger that the difference in density with respect to the original image will become larger and larger by further repetitive processing. By contrast, the second modification provides means for improving upon this problem and is characterized in that MAX, MIN for deciding the threshold value which creates the edge uses information based upon the window after linear subsampling (the information the first time is the original information), and MAX, MIN serving as binarization representatives after edge creation use the information of the original image (the information at input terminal 322 in FIG. 24). By virtue of this processing, the quantization representatives binarized are always the pixel values of the original image information, and side effects of a change in density dimension can be avoided merely by improving the jaggies in the resolution dimension.

Further, according to the second embodiment, the values of MAX, MIN are inputted from the original image information each time during repetitive processing. However, the invention is not limited to this example. It is effective to use MAX, MIN of the original image only in the last cycle of repetitive processing, e.g., only in the N-th processing cycle if processing is executed in N loops, and to use MAX, MIN after linear subsampling (the information the first time is the original information) is performed, just as in the first embodiment, in processing up to the (N−1)th cycle.

In the description of the embodiment thus far, examples are described in which the interpolating means all perform linear interpolation. However, this does not impose a limitation upon the invention.

According to the second and third embodiments described above, it is mentioned that the edge creating means performs binarization based upon a threshold value [(MAX+MIN)/2]. However, it goes without saying that other edge creating means may be used.

Further, an embodiment is described in which smoothing filters are changed over adaptively based upon partial features of the input image. However, it is also effective to change over the filters in conformity with the number of times repetitive processing is executed.

In accordance with the second and third embodiments as described above, jaggies produced when input low-resolution information is converted to high-resolution information, and jaggies already produced owing to device limitations upon image input or limitations imposed by application software used to create the image are converted to smooth curves.

Further, it is possible to control smoothness by controlling the number of times repetitive processing is performed.

Further, the portion converted to a curve can be cut and divided by adaptive filter processing.

Thus, in accordance with the first to third embodiments, low-resolution image information can readily be converted to high-resolution information. As a result, by applying the invention to communication between machine models having different resolution as well as to printers and copiers which output high-quality images upon enlarging images by zooming, images having a high picture quality can be outputted.

In accordance with the embodiments as described above, jaggies produced when input low-resolution information is converted to high-resolution information, and jaggies already produced owing to device limitations upon image input or limitations imposed by application software used to create the image can be converted to smooth curves. Further, it is possible to control smoothness by controlling the number of times repetitive processing is performed, and a portion converted to a curve can be cut and divided by adaptive filter processing.

Furthermore, in accordance with the embodiments, edge information is estimated and created from input low-resolution information, and the edge information is added on. This makes it possible to create high-resolution information having sharp edges without visual blurring. Further, by adaptively changing the allocation ratio of linearly interpolated information and created edge information, non-linearity of edge size and edge shape is changed with ease. In particular, in a case where an input is a natural picture, it is possible to avoid image of artificial picture tones due to creation of artificial edges.

Thus, in accordance with the embodiments, low-resolution image information is converted to high-resolution information. As a result, the invention can be applied to various apparatus. For example, it is possible to provide communication between machine models having different resolution as well as printers and copiers which output high-quality images upon enlarging images by zooming.

<Fourth Embodiment>

Figure 29:
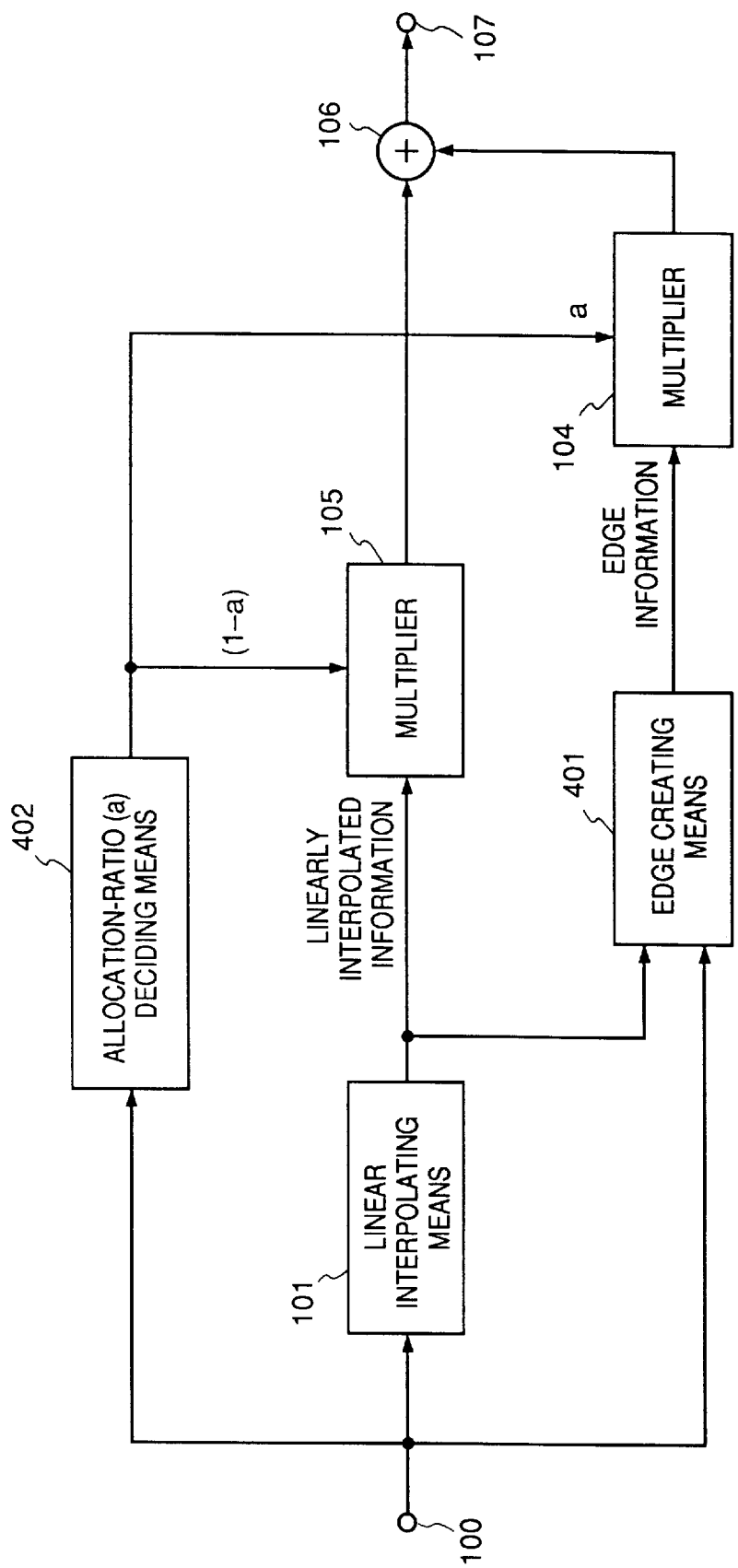
FIG. 29 is a block diagram showing the construction of an image processing apparatus according to a fourth embodiment.

FIG. 29 is a block diagram illustrating the construction of an image processing apparatus according to a fourth embodiment.

In FIG. 29, numeral 100 denotes the input terminal from which low-resolution image information enters. This information is sent to the linear interpolating means 101. Here pixels between original samplings are filled in by linear interpolation (bi-linear interpolation processing) to create interpolated information increased by a factor of N vertically and M horizontally. This linear interpolation processing has already been described and need not be described again. Numeral 401 denotes edge creating means according to the fourth embodiment. The edge creating means 401 creates an edge for every block of interpolated information of N pixels×M pixels centered on a pixel of interest (denoted by Ixy) of low-resolution information. The details of edge creation will be described later.

Numeral 402 denotes allocation-ratio deciding means for calculating allocation ratio (denoted by "a", where $0 \leq a \leq 1$) when linearly interpolated information that has been created and edge information are combined. The allocation ratio also is decided in block units of N×M pixels. The decision of allocation ratio will be described later in detail. The multiplier 104 multiplies the edge information a times using the allocation ratio a obtained, and the multiplier 105 multiplies the linearly interpolated information by (1−a). The products calculated by the multipliers 104, 105 are combined by the adder 106. The result of converting the input image information to the information increased by a factor of N×M is outputted from an output terminal 107.

Figure 30:
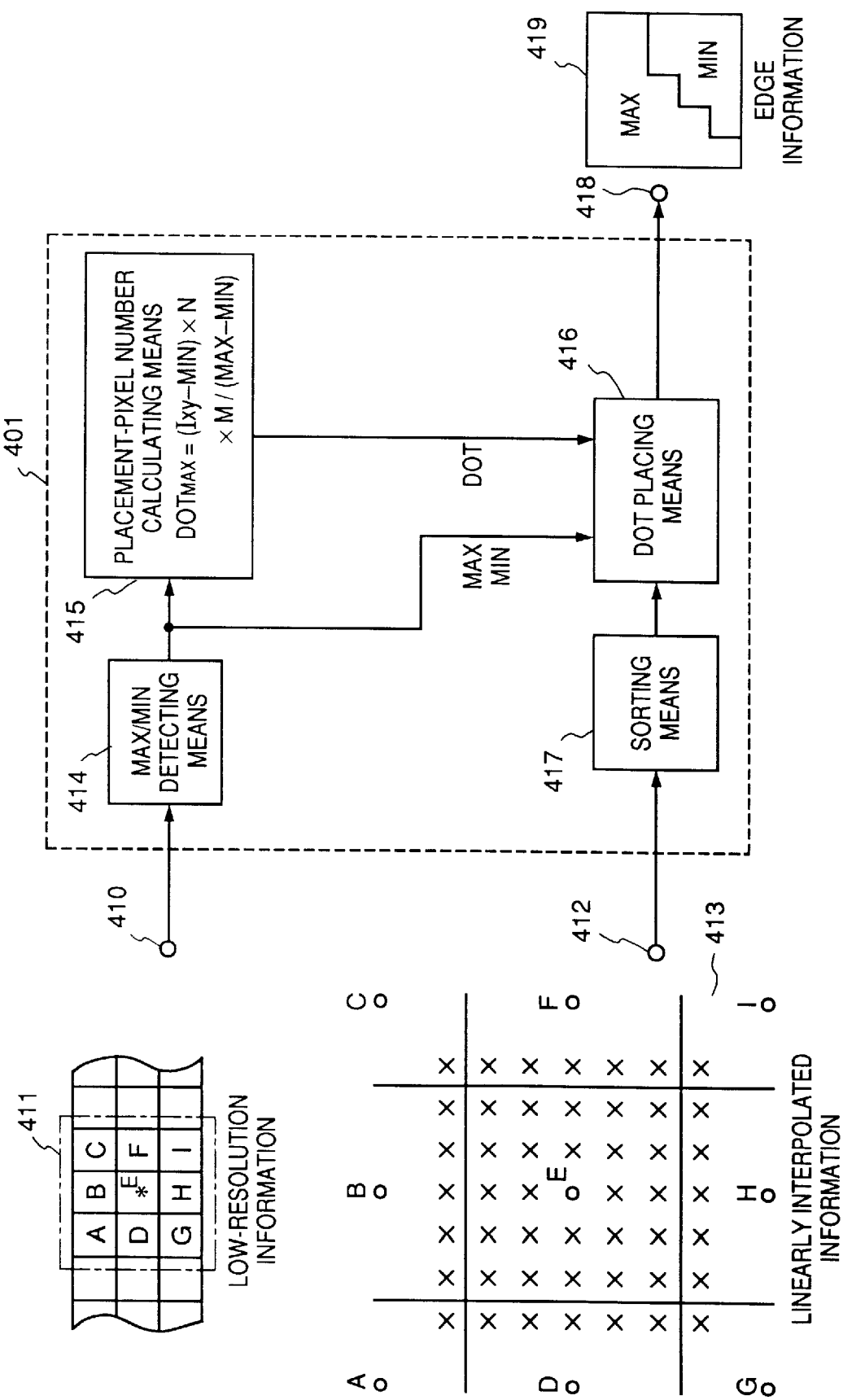
FIG. 30 is a diagram showing the detailed construction of edge creating means illustrated in FIG. 29.

FIG. 30 is a diagram showing the details of the edge creating means 401 illustrated in FIG. 29. The edge creating means 401 is the characterizing feature of the fourth embodiment. The components enclosed by the dashed line in FIG. 30 correspond to the edge creating means 401. Numeral 410 in FIG. 30 denotes an input terminal for low-resolution information. The input information is indicated at 411, in which the pixel E corresponds to the pixel of interest and the portion enclosed by the one-dot chain line is a window of pixels neighboring the pixel of interest. Numeral 412 denotes an input terminal to which the signal from the linear interpolating means 101 (shown in FIG. 29) is applied. The information which enters from this terminal is indicated at 413. The broken line at 411 indicates the boundary of blocks centered on a pixel of low-resolution information, and the portion enclosed by the solid line at 413 is a block regarding the pixel E of interest. The circle marks indicate pixels of low-resolution information, and the "x" marks indicate interpolated pixels.

The low-resolution information which has entered from the input terminal 410 is applied to MAX/MIN detecting means 414, which detects a maximum value (MAX) and a minimum value (MIN) within the window. The detected MAX and MIN information is sent to placement-pixel number calculating means 415, which calculates the number of pixels of each of two representative values for creating an edge. If we let DOTMAX represent the number of pixels for placing the pixel which MAX is representative value and let DOTMIN represent the number of pixels for placing the pixel which MIN is representative value, then the numbers of pixels will be decided by the following equations:

DOTMAX=($I_{xy}$−MIN)×N×M/(MAX−MIN)

DOTMIN=N×M−DOTMAX

Each DOT decided, as well as MAX and MIN, is sent to dot placing means 416. Meanwhile, the block 413 centered on the pixel E of interest subjected to linear interpolation and entering from the input terminal 412 is sent to sorting means 417, which sorts the linearly interpolated pixels within the block in descending order of pixel values. The sorting algorithm itself is not defined here.

Sorted pixels within the block containing E are substituted by MAX in a number equivalent to DOTMAX in descending order of the pixel values by the dot placing means 416, and MIN is substituted for the other pixels in the block. Information of a block in which binarization representatives are allocated in the form of MAX, MIN, as indicated at 419, is outputted from an output terminal 418.

The above-mentioned linear interpolation and the manner in which edge creation is performed will be described using FIGS. 4A, 4B referred to earlier with regard to the first embodiment. As mentioned above, the circle marks indicate pixel values of sampling points of low resolution, and the x marks indicate pixel values of interpolated points interpolated between the above-mentioned pixel values. The point indicated by the circle mark situated at the central position is the pixel of interest. As shown in FIG. 4A, MAX, MIN values are detected from the adjacent pixels and DOTMAX is calculated in accordance with the above-mentioned equation. If we assume that an enlarged pixel block centered on the pixel of interest is composed of five pixels and that DOTMAX is composed of four pixels, then, as shown in FIG. 4B, four pixels of large pixel values will be equal to MAX and one pixel of a small pixel value will be equal to MIN.

An example in which edge information is created will now be described with reference to FIGS. 5A, 5B. This will be described with regard to the equation for calculating DOT mentioned above. In the example of FIGS. 5A, 5B, it is assumed that the low-resolution information is converted to high-resolution information increased by a factor of N vertically and a factor of M horizontally. The example here is for a case in which N=M=8 holds. Assume here that the centrally located pixel of interest has a pixel value of "80", as shown in FIG. 5B. In a case where high-resolution information is considered, the low-resolution pixel "80" is an edge portion in which two values of pixel "200" and pixel "20" are contained at a certain ratio. Creating a value of 80 is assumed since the resolution is made low. In other words, in a case where preservation of density is considered, we have the following if A represents the ratio of high resolution 200 contained in the pixel of low resolution 80 and B represents the ratio of 20:

$$200 \times A + 20 \times B = 80$$

Using the variables Ixy, MAX, MIN gives us $$MAX \times A + MIN \times B = Ixy$$

Since it is assumed that A+B=1 holds, we have $$MAX \times A + MIN \times (1-A) = Ixy$$

That is, we have $$A = (Ixy - MIN)/(MAX - MIN)$$

In order to enlarge one pixel of low resolution to information of (N×M) pixels, the number of pixels DOTMAX for placing MAX values is represented by the following:

$$DOTMAX = (Ixy - MIN) \times N \times M / (MAX \times MIN)$$

In this example, Ixy=80, MAX=200, MIN=20, N=M=8. Therefore, when these are substituted into the above-mentioned equation, the number of pixels DOTMAX for placing MAX values becomes 21 pixels. In other words, in 64 pixels made factor of 8×factor of 8, the value of 200, which is MAX, is substituted into 21 pixels is descending order of the pixel values, and the value of 20, which is MIN, is substituted into the remaining 43 pixels.

Thus, an edge is created in a block corresponding to the pixel of interest.

By virtue of the edge creation processing described above, it is possible to create a smooth edge, namely high-resolution information, in the high-resolution dimension within an enlarged block.

Figure 31:
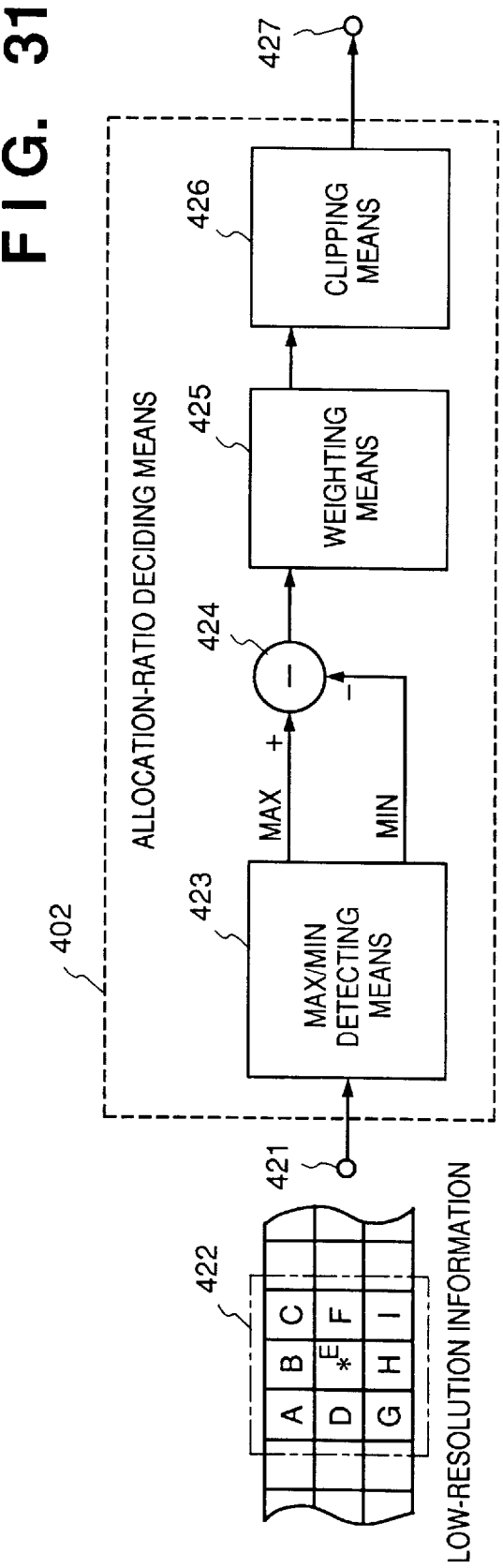
FIG. 31 is a diagram showing the detailed construction of allocation-ratio deciding means.

FIG. 31 illustrates the construction of the allocation-ratio deciding means 402, which is enclosed by the dashed line. The allocation-ratio deciding means has an input terminal 421 from which the low-resolution information indicated at 422 enters. The pixel E is adopted as the pixel of interest, as described in connection with FIG. 30. As in the manner of the edge creating means 401, MAX and MIN values within the window are detected by MAX/MIN detecting means 423. It goes without saying that the detecting means within the edge creating means 401 can be used as the MAX/MIN detecting means 423. Numeral 424 denotes a subtractor for performing a (MIN−MAX) operation. That is, this operation corresponds to obtaining the dynamic range within the window.

Numeral 425 denotes weighting means, which is a coefficient multiplier provided in order to decide whether the edge information, which prevails when the allocation ratio a is obtained, should be given more emphasis or less emphasis. The coefficient may be obtained experimentally in order to be optimized for the system. Alternatively, the coefficient may be decided in conformity with the image being handled.

Numeral 426 denotes clipping means for clipping overflow of values due to multiplication by the coefficient. The allocation ratio a thus calculated is outputted from an output terminal 427 and supervises the combination of edge information and linearly interpolated information.

By virtue of the foregoing processing, the edge information created shows greater dependence at portions where edges are steep and the linearly interpolated information shows greater dependence at portions where edges are flat.

<First Modification of Fourth Embodiment>

Figure 32:
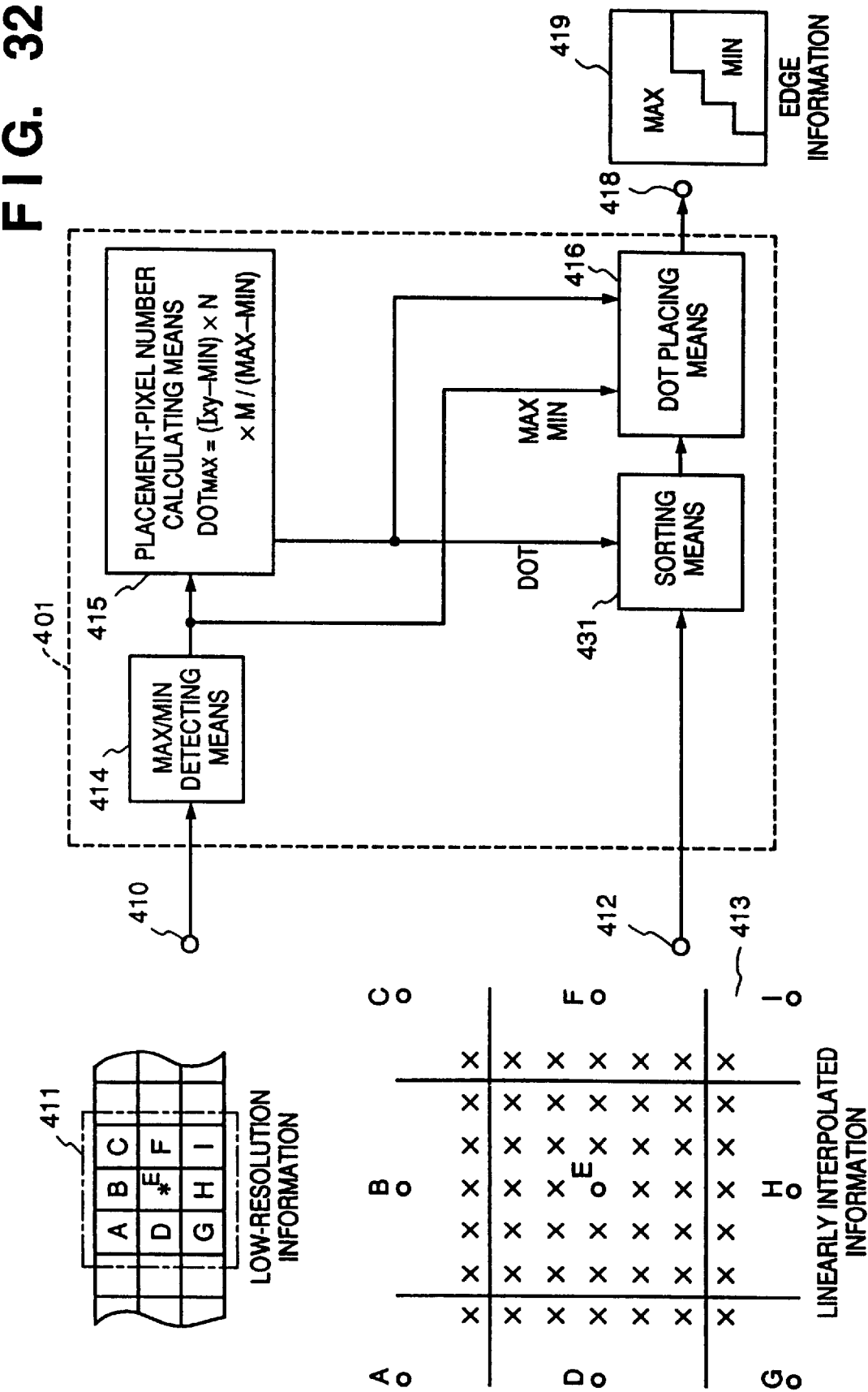
FIG. 32 is a block diagram showing a first modification of edge creating means illustrated in FIG. 29.

FIG. 32 is a block diagram illustrating a first modification of the edge creating means 401 according to the fourth embodiment. This modification differs from the fourth embodiment in that the sorting means 417 of the edge creating means 401 of FIG. 30 is simplified. Elements identical with those shown in FIG. 30 are designated by like reference characters. As in the fourth embodiment, the placement-pixel number calculating means 415 calculates the number of pixels for placing MAX value and the number of pixels for placing MIN value. The characterizing feature of the first modification is that the numbers of pixels calculated by the placement-pixel number calculating means 415 are sent to the sorting means 431.

Discontinuation of sorting in the sorting means 431 is decided by either of the numbers of pixels sent. For example, on the assumption that DOTMAX is 21 pixels (the block is N=M=8, for a total of 64 pixels), a value indicating 21 pixels enters the sorting means 431 and it will suffice if each pixel of the linearly interpolated information is limited to 21 pixels in descending order of the values. Sorting is unnecessary with regard to pixels having lower values. MAX is placed for the higher order 21 pixels by the dot placing means 416, and MIN is placed for the other 43 pixels. This is the same as in the foregoing embodiment. By thus simplifying the sorting means, processing is executed at higher speed.

<Second Modification of Fourth Embodiment>

Figure 33:
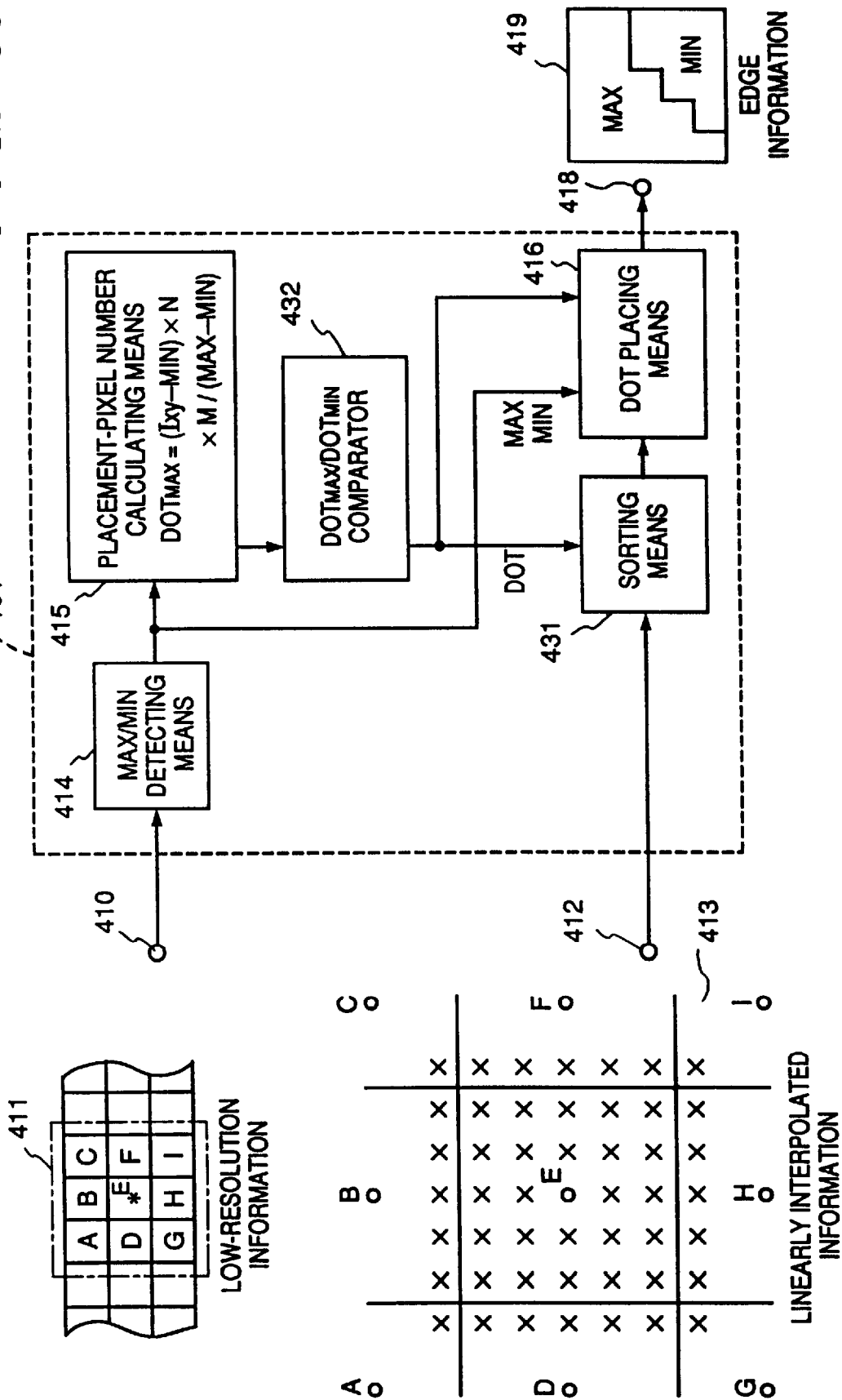
FIG. 33 is a block diagram showing a second modification of edge creating means illustrated in FIG. 29.

FIG. 33 is a block diagram illustrating a second modification of the edge creating means 401 according to the fourth embodiment. This modification differs from the second modification shown in FIG. 32 in that the sorting means 431 is simplified even further. Elements identical with those shown in FIG. 32 are designated by like reference characters. As in the fourth embodiment, the placement-pixel number calculating means 415 calculates the number of pixels for placing MAX value and the number of pixels for placing MIN value. The characterizing feature of the second modification is that a DOTMAX/DOTMIN comparator 432 compares the numbers of pixels calculated by the placement-pixel number calculating means 415 to determine which is smaller.

The DOTMAX/DOTMIN comparator 432 compares the numbers of pixels sent thereto in order to determine which is smaller. The smaller number of pixels is sent to the sorting means 431. This comparison may be performed by comparing the numbers of pixels against each other. Alternatively, either number of pixels, e.g., DOTMAX only, may be calculated and DOTMAX may then be compared to determine whether it is larger or smaller than ½ of the number of pixels (N×M) of the block. For example, DOTMIN is sent to the sorting means 431 if it is larger than ½ and DOTMAX is sent to the sorting means 431 if it is smaller than ½. As a result, it will suffice for the sorting means 431 to perform ranking of a maximum of (N×M/2) pixels. By thus simplifying the sorting means, processing can be executed at higher speed.

In accordance with the fourth embodiment, as described above, values of peripheral pixels are arranged for each pixel within a block of high-resolution information corresponding to a pixel of interest in an area ratio in which the value of the pixel of interest of input low-resolution information can be preserved, thereby creating edge information by estimation. This makes it possible to create high-resolution information having sharp edges. Further, since edge creation is performed based upon sorting of linearly interpolated pixel values, an excellent edge can be created. Furthermore, by adaptively changing the allocation ratio of linearly interpolated information and created edge information, non-linearity of edge size and edge shape is changed with ease. In particular, in a case where an input is a natural picture, it is possible to avoid images of artificial picture tones due to creation of artificial edges.

<Fifth Embodiment>

A fifth embodiment of the present invention will now be described in detail with reference to the drawings.

Figure 34:
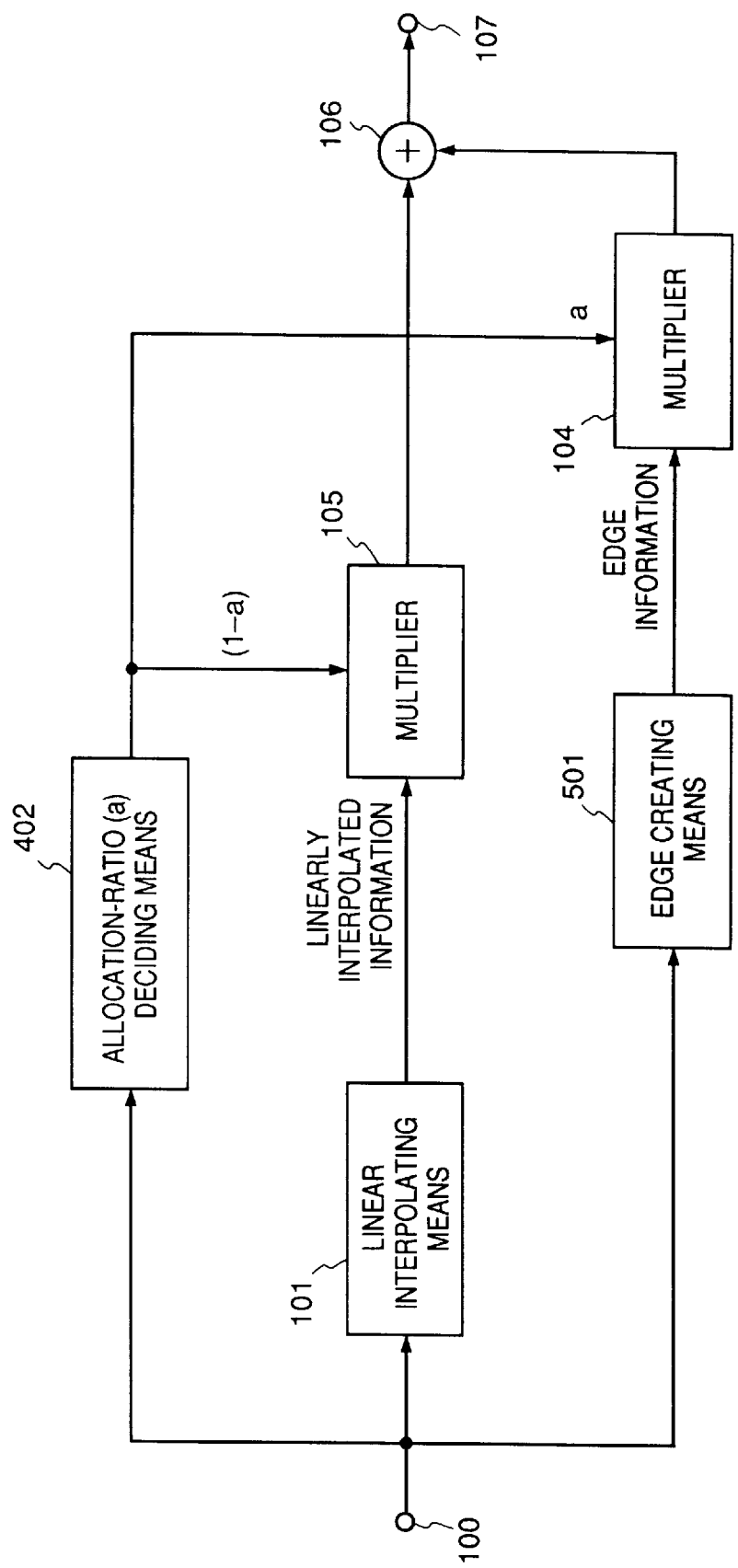
FIG. 34 is a block diagram showing the construction of an image processing apparatus according to a fifth embodiment.

FIG. 34 is a block diagram illustrating the construction of an image processing apparatus according to the fifth embodiment. Elements identical with those of the fourth embodiment are designated by like reference characters and need not be described again. Numeral 501 denotes edge creating means according to the fourth embodiment. The edge creating means 501 creates an edge for every block of N pixels×M pixels centered on a pixel of interest (denoted by Ixy) of low-resolution information. The details of edge creation will be described later.

Figure 35:
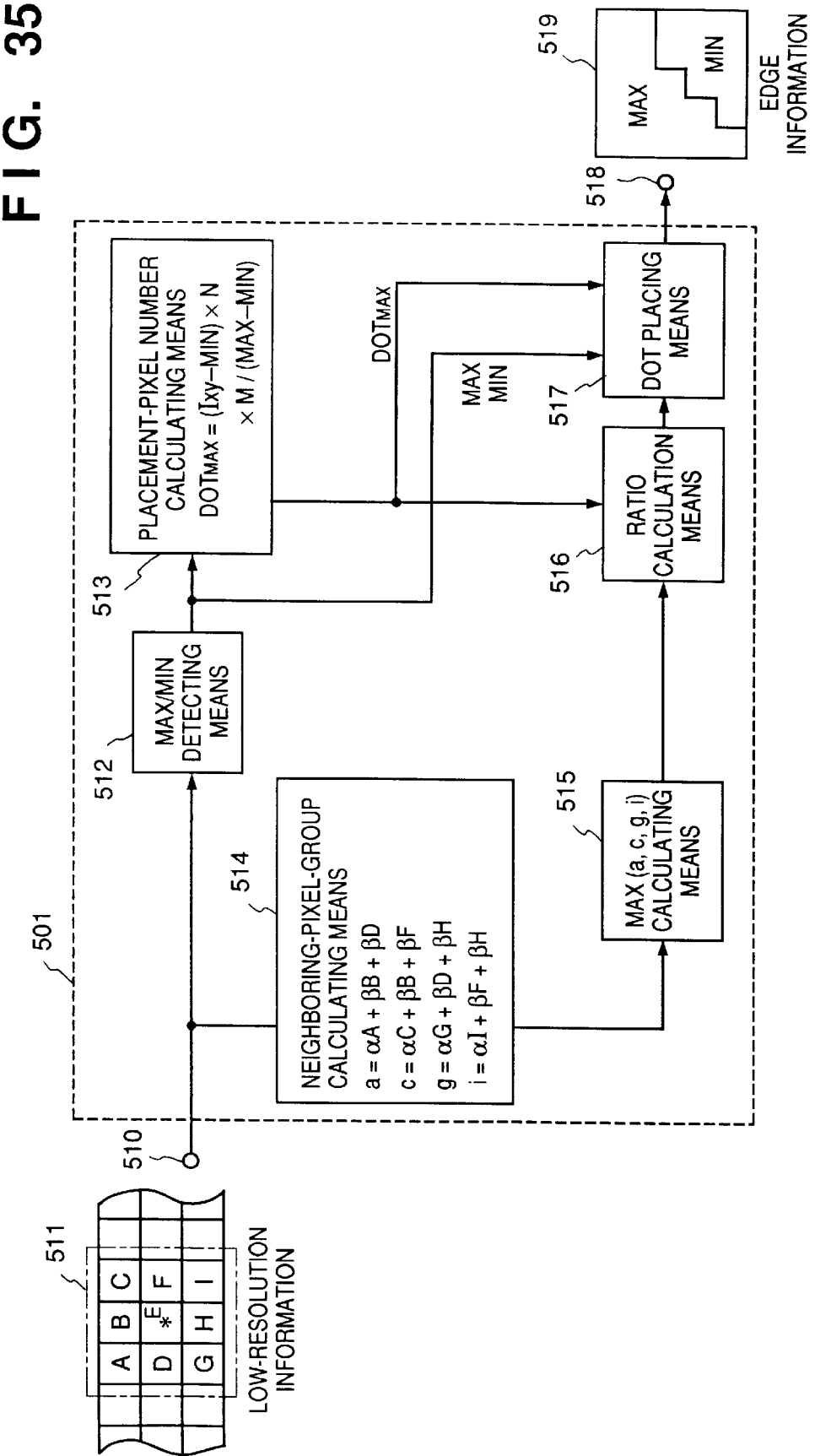
FIG. 35 is a diagram showing the detailed construction of edge creating means illustrated in FIG. 34.

FIG. 35 is a diagram showing the details of the edge creating means 501 illustrated in FIG. 34. The edge creating means 501 is the characterizing feature of the fifth embodiment. The components enclosed by the dashed line in FIG. 35 correspond to the edge creating means 501. Numeral 510 in FIG. 35 denotes an input terminal for low-resolution information. The input information is indicated at 511, in which the pixel E corresponds to the pixel of interest and the portion enclosed by the one-dot chain line is a window of pixels neighboring the pixel of interest.

The low-resolution information 511 which has entered from the input terminal 510 is applied to MAX/MIN detecting means 512, which detects a maximum value (MAX) and a minimum value (MIN) within the window. The detected MAX and MIN information is sent to placement-pixel number calculating means 513, which calculates the number of pixels of each of two representative values for creating an edge. If we let DOTMAX represent the number of pixels for placing the pixel which MAX is representative value and let DOTMIN represent the number of pixels for placing the pixel which MIN is representative value, then the numbers of pixels will be decided by the following equations:

DOTMAX=($I_{xy}$−MIN)×N×M/(MAX−MIN)

DOTMIN=N×M−DOTMAX

Neighboring-pixel-group calculating means 514 calculates the pixel vales of a group of pixels neighboring the pixel E of interest on the basis of window information. The calculation of the group of neighboring pixels is processing for roughly estimating values at the four corners of the pixel of interest. The values at the four corners are calculated as follows:

Upper left corner: a=αA+βB+βD
Upper right corner: c=αC+βB+βF
Lower left corner: g=αG +βD+βH
Lower right corner: i=αI+βF+βH (where α, β are coefficients).

The calculated values of the group of pixels at the four corners are sent to MAX(a,c,g,i) placement-pixel number calculating means 515, where the corner having the largest of the four values is selected. The selected corner is regarded as the above-mentioned DOTMAX. Next, the ratio between pixels adjacent the corner of the maximum value on both sides thereof is calculated by ratio calculating means 516. For example, if the corner having the largest value in the pixel group is i, then the calculating means 516 calculates the ratio between the values of F and H, which are the pixels adjacent the corner i on both sides thereof. Dots of MAX and MIN are placed on the basis of the calculated ratio and the numbers of pixels calculated by the placement-pixel number calculating means 513. Information of a block in which an edge has been created as shown at 519 is outputted from an output terminal 518.

FIGS. 36A, 36B are diagrams showing an example in which dot placement is decided by a ratio.

Assume here that the centrally located pixel of interest of low-resolution information has a pixel value of "60", as shown in FIG. 36A. Assume that one pixel of this pixel of interest is enlarged to 25 pixels, namely by a factor of five both vertically and horizontally. Owing to the fact that Ixy=60, N=M=5, MAX=180, MIN=20 hold, the number of pixels (DOTMAX) calculated by the placement-pixel number calculating means 513 is six pixels. In other words, the value "180", which is MAX, is placed at six pixels among the 25 pixels enlarged, and the value "20", which is MIN, is placed at the other 19 pixels. Accordingly, to which pixels of the 25 pixels these six pixels should be applied is the characterizing feature of the fifth embodiment.

Here the value which is the maximum of the pixel group is the lower right corner of the pixel of interest owing to the operation of the comparing means, and the dots of MAX are placed about this corner as center. The pixels adjacent this corner on both sides thereof are "160" and "80", and 2:1 is the ratio between x, y shown in FIG. 36B. More specifically, the values of x, y are calculated in such a manner that the number of dots becomes six pixels while the ratio x:y maintains the ratio 2:1. A slanted line is drawn based upon the x, y calculated, and dots of MAX ("180" in this case) are placed at pixels situated on the corner side of the slanted line. Dots of MIN ("20" in this case) are placed at the remaining 19 pixels within the block. In other words, the slanted line corresponds to the shape of the predicted edge.

Thus, an edge is created in a block corresponding to the pixel of interest.

In the example of FIGS. 36A, 36B, it is possible for the shape of the edge on which MAX is placed to be a triangle inside the block. Depending upon the value of DOTMAX, however, there are cases in which a triangular shape is not possible.

Figure 37A:
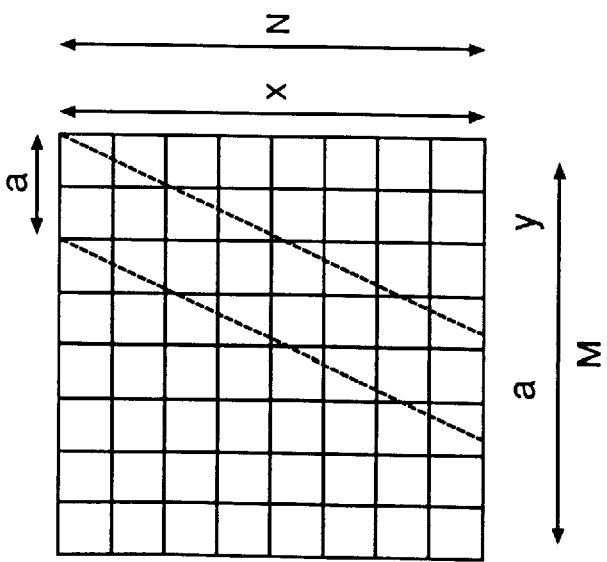
FIGS. 37A–37C are diagrams showing an example in which an edge becomes a quadrangle within a block.
Figure 37B:
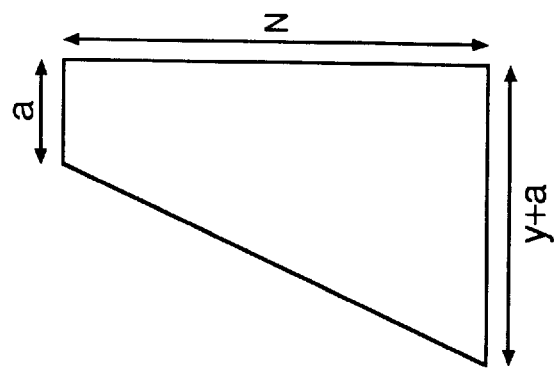
Figure 37C:
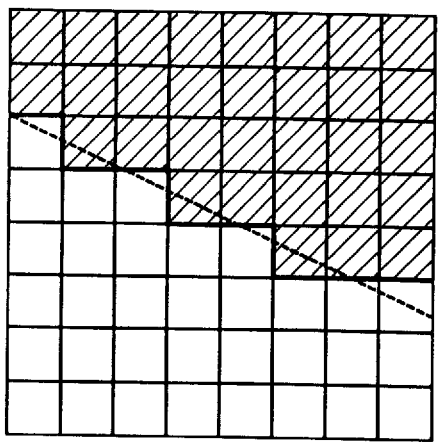

FIGS. 37A–37C are diagrams showing an example in which an edge becomes a quadrangle within a block. For example, when x>y holds, there are cases in which the area of a triangle is less than the calculated DOTMAX even if x=N holds (y=M holds at the time x<y). In this case, the angle of the slanted line drawn when x=N holds is maintained, values of x (x=N in this case), y and α are calculated in such a manner that the slanted line is translated a distance a shown in FIG. 37A and the area of the quadrangle shown in FIG. 37B becomes suited to the number of dots of MAX, the pixels inside the quadrangle are placed so as to be filled with values of MAX, and the other pixels are placed using values of MIN.

Similarly, in a case where the shape of the edge is a pentagon inside the block, the position of the slanted line is calculated in such a manner that the area becomes suited to the number of dots of MAX by translation of the slanted line.

By virtue of the edge creation processing described above, it is possible to create a smooth edge, namely high-resolution information, in the high-resolution dimension within an enlarged block.

<First Modification of Fifth Embodiment>

Figure 38:
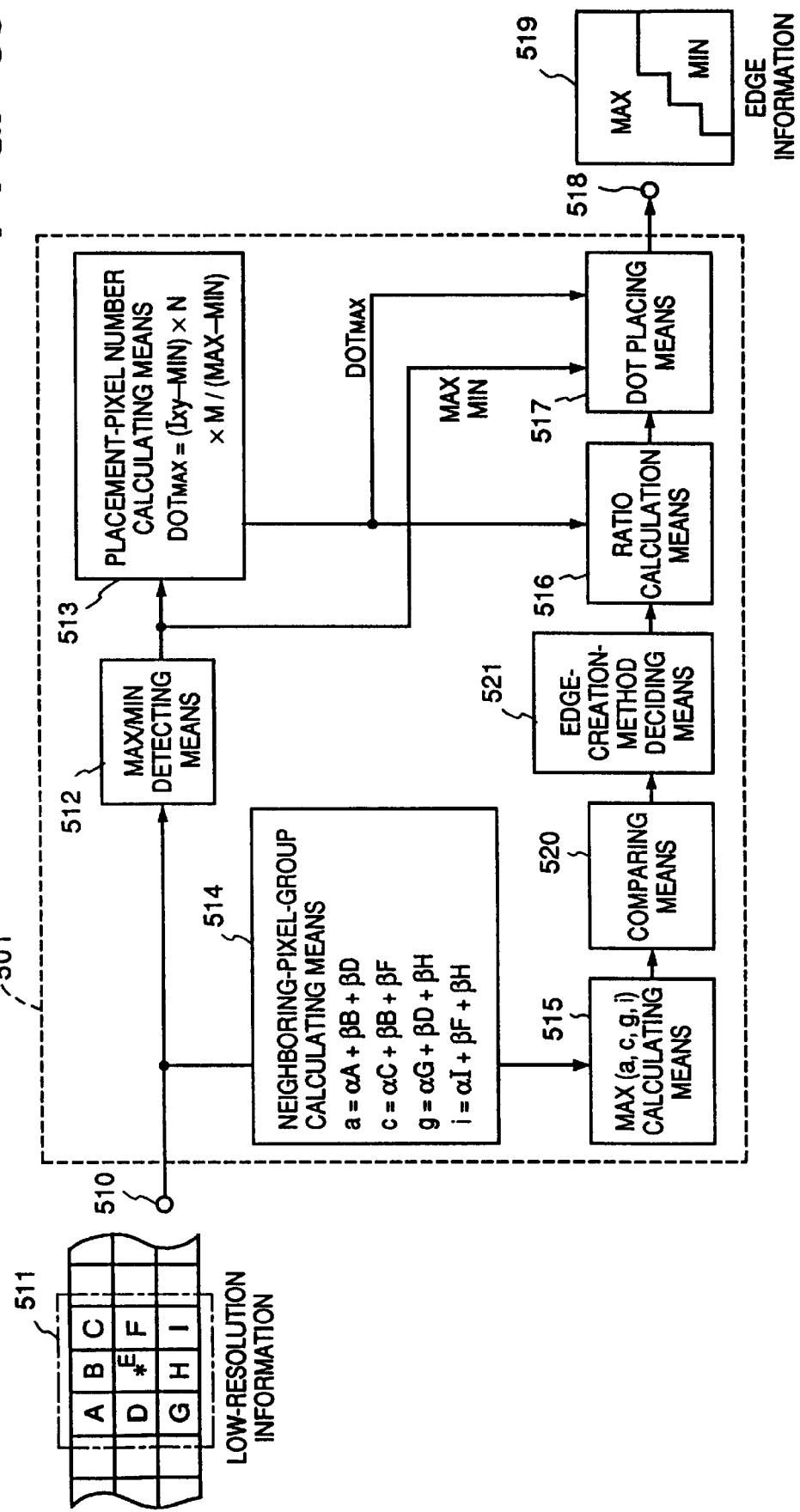
FIG. 38 is a block diagram showing a first modification of edge creating means illustrated in FIG. 34.

FIG. 38 is a block diagram illustrating a first modification of the edge creating means 501 (shown in FIG. 34) according to the fifth embodiment. According to the first modification, there are a plurality of edge creating means which are selected based upon mutual comparison of pixel values inside a window.

Elements in FIG. 38 identical with those shown in FIG. 35 are designated by like reference characters.

As in the fifth embodiment, the MAX(a,c,g,i) calculating means 515 calculates the largest value among the pixels at the four corners of the pixel of interest. On the basis of the signal indicative of the largest value among this group of pixels, comparing means 520 compares the sum of the corner taking on the largest value and the corner adjacent thereto, and the sum of the two opposing corners. For example, if the corner taking on largest value is i among the four corners (a,c,g,i) mentioned above, the comparing means 520 determines whether the following holds:

$$(i+c)-(g+a)>th1 \quad (1)$$

$$(i+g)-(c+a)>th1 \quad (2)$$

(where th1 is a threshold value set in advance). That is, it is roughly judged whether an edge in the block shown in FIG. 35 is an edge along an inclined direction centered on one corner or an edge extending vertically or horizontally. In a case suited to Eq. (1) above, (i+c) is farther away than (g+a), and therefore is can be predicted that the edge is vertical. In a case suited to Eq. (2) above, (i+g) is farther away than (c+a), and therefore is can be predicted that the edge is horizontal.

In a case where it is judged that the edge is a vertically extending edge, the following condition may be added to Eq. (1)

$$i-c<th2 \quad (3)$$

(where th2 is a threshold value set in advance). In a case where it is judged that the edge is a horizontally extending edge, the following condition may be added to Eq. (2):

$$i-g<th2 \quad (4)$$

Edge-creation-method deciding means 521 in FIG. 38 receives the results of comparison mentioned above and decides edge creation direction based upon whether an edge is slanted, vertical or horizontal. In a case not suited to the above-mentioned conditions, an edge is judged to be a slanted edge and, in a manner similar to that of the fifth embodiment, the ratio calculating means 516 creates an edge based upon a ratio between pixels adjacent the corner of the maximum value on both sides thereof. If an edge is judged to be vertical or horizontal, the ratio calculating means 516 obtains the ratio (B:H in this case) between pixels above and below the pixel of interest in case of a vertical edge, obtains the ratio (D:F in this case) between pixels to the left and right of the pixel of interest in case of a horizontal edge, and creates an edge so as to include the corner that takes on the maximum value.

FIGS. 39A–39C are diagrams showing an example of edge creation in the vertical direction. Assume here that the centrally located pixel of interest has a pixel value of "100", as shown in FIG. 39A. Assume that the pixel of interest is resolution-converted by a factor of eight in each of the vertical and horizontal directions.

Assume that an edge is judged to be a longitudinal edge in agreement with Eqs. (1) and (3) above. On the basis of pixel values "100", "120" above and below the pixel of interest, values of x and y are calculated in such a manner that x, y take on the ratio 1:1.2 and the area of the quadrangle shown in FIG. 39C becomes suited to the number of dots of MAX.

Owing to the fact that Ixy=100, N=M=8, MAX=180, MIN=40 hold in this example, the number of pixels (DOTMAX) calculated by the placement-pixel number calculating means 513 is 27 pixels. In other words, the value "180" is placed at 27 pixels among the 64 pixels in the block, and the value "40" is placed at the other 37 pixels. Since the corner indicating the largest value among the four corners is the lower right corner, a slanted line is drawn from the right direction based upon the values of x, y obtained, and the interior of the quadrangle is filled by DOTMAX. Thus, a vertical edge is created, as shown in FIG. 39B. The procedure for creating a horizontal edge is the same.

<Second Modification of Fifth Embodiment>

Figure 40:
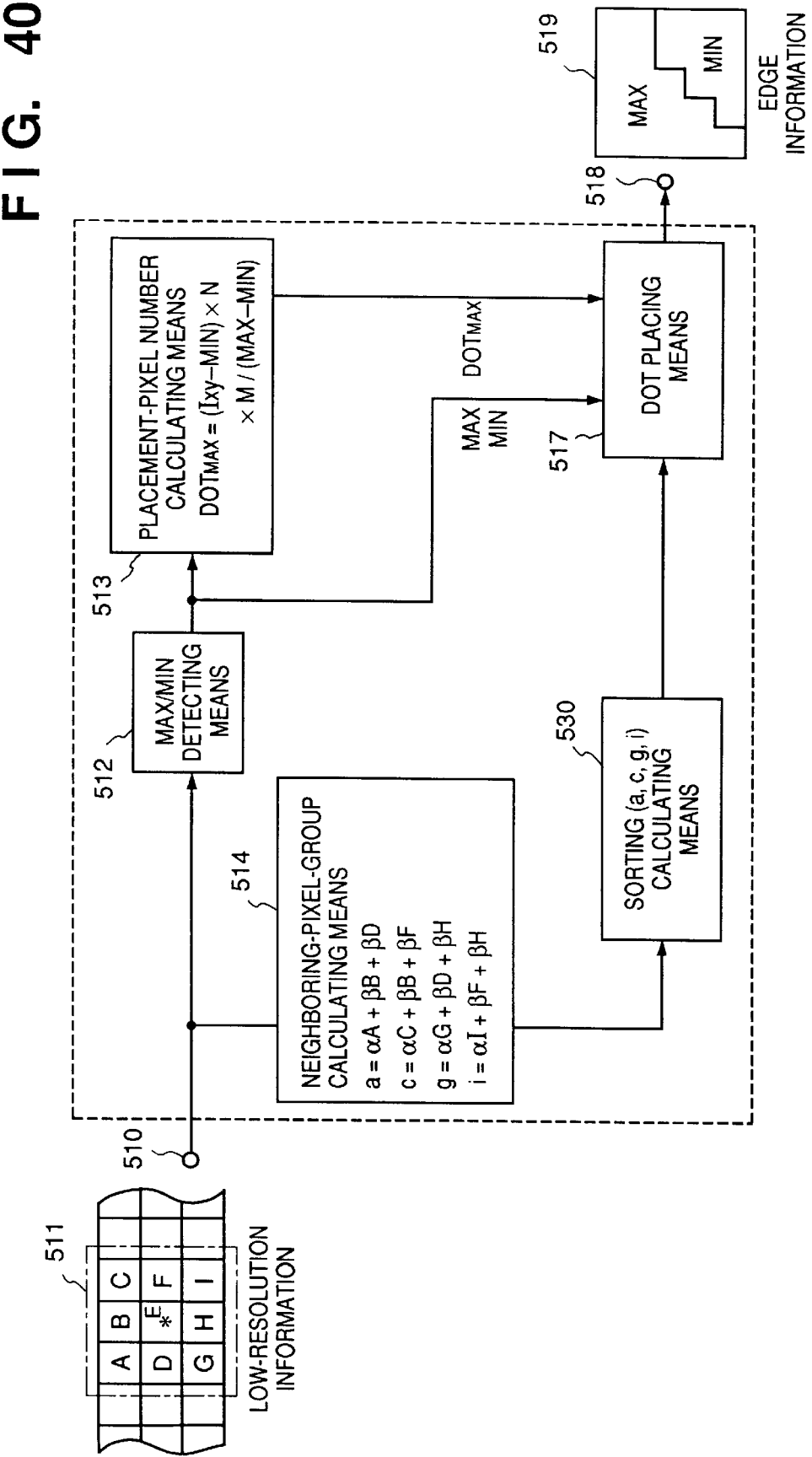
FIG. 40 is a block diagram showing a second modification of edge creating means illustrated in FIG. 34.

FIG. 40 is a block diagram showing a second modification of the edge creating means 501 (shown in FIG. 34) according to the fifth embodiment. The second modification provides edge creating means simpler than the edge creating means according to the fifth embodiment and first modification thereof. This modification is useful mainly at low magnifications.

Elements shown in FIG. 40 identical with those of FIG. 35 are designated by like reference characters. Numeral 530 denotes sorting means for sorting, in descending order, values of the group of pixels set in the neighboring-pixel-group calculating means 514. It will suffice if corners up to the second of the four corners are sorted in descending order. The second modification is characterized in that DOTMAX is placed from the corner having the largest value to the corner having the second largest value based upon the calculated sorting information.

Figures 41A, 41B, 41C:
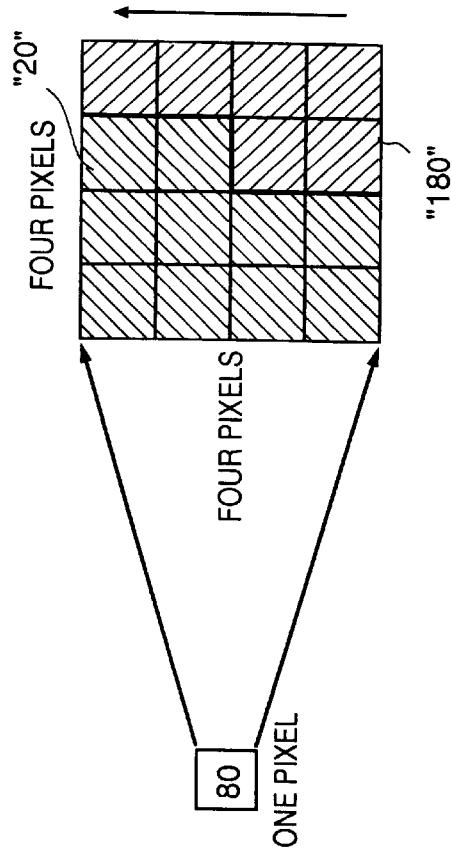
FIGS. 41A–41C are diagrams showing an example of edge creation according to the second modification.

Edge creation in the second modification will be described with reference to FIGS. 41A–41C. Assume here that the centrally located pixel of interest has a pixel value of "80", as shown in FIG. 41A. If the values of the group of pixels at the four corners are sorted in descending order, the result will be as shown in FIG. 41B. The largest is at the lower right, and the next largest is at the upper right. Owing to the fact that Ixy=80, N=M=4, MAX=180, MIN=20 hold in this example, the number of pixels (DOTMAX) calculated by the placement-pixel number calculating means 513 is six pixels. In other words, "180" is placed at six pixels in the block and "20" is placed at the other ten pixels. This is a method of placing six pixels. The six pixels are arranged from lower right to upper right indicated by the sorted information. This makes it possible to readily create an edge inside a block. Further, in a case where the largest corner and the second largest corner oppose each other owing to the operation of the sorting (a, c, g, i) calculating means 530, it is judged that the edge is not a simple edge and it may be so arranged that edge creation processing is not carried out.

Though several edge creating means have been described, it is possible to change over among these means adaptively. Further, the means for creating edges depending upon the states of pixels neighboring the pixel of interest and the ratio of the respective pixel values is not limited to the methods described thus far.

Furthermore, a method of limiting blocks which undergo this processing to the center of the edge portion of an image also is effective. In addition, window size and window shape are not limited to the embodiments described above.

In accordance with the fifth embodiment described above, the sense, direction and sense of an edge is estimated from input low-resolution information, and the estimated information is made the basis of processing. As a result, high-resolution information having sharp edges can be created. Since the edge creating means is based upon the size relationship and ratio between peripheral pixels, it is possible to create excellent edges in a simple manner.

<Sixth Embodiment>

Figure 42:
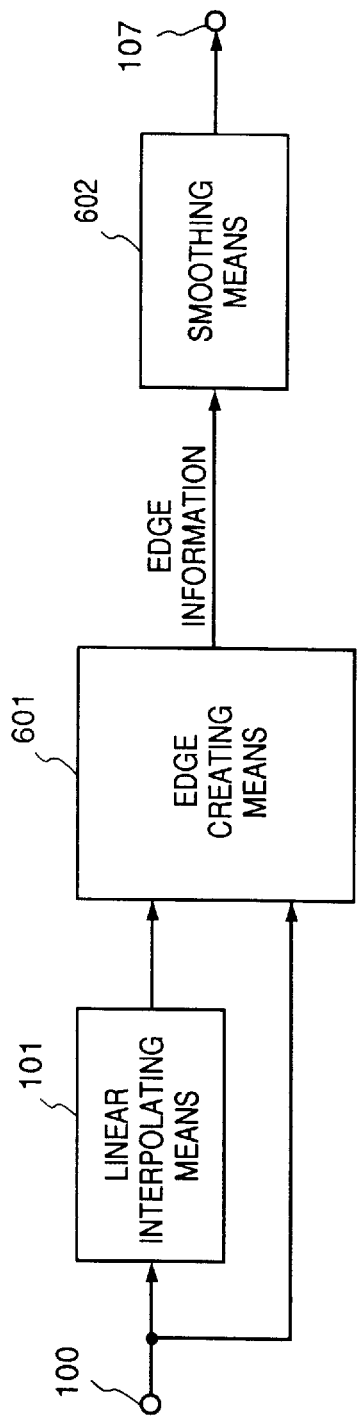
FIG. 42 is a block diagram showing the construction of an image processing apparatus according to a sixth embodiment.

FIG. 42 is a block diagram illustrating a sixth embodiment of the present invention. Elements identical with those shown in FIG. 29 are designated by like reference characters. In FIG. 42, numeral 100 denotes the input terminal from which low-resolution image information enters. In the case of an image containing halftones, such as a natural picture, characters and line drawings created by a host computer or the like differ from such an image and it may be considered that an LPF (low-pass filter) of some kind is being applied at the time of image creation. Here the dependency of resolution of the input image information is considered. With a character or line image created by a host computer or the like, the edge produced at low resolution depends upon the original resolution. As a consequence, annoying frequency components are encountered in conversion of resolution. Accordingly, it is necessary to perform the conversion of resolution after the annoying frequency components are eliminated (after edges are destroyed) and create an edge (information of high frequency component) suited to the new resolution.

In case of an natural picture, on the other hand, an LPF filter is applied as mentioned above. As a result, this is almost a state of device independent resolution even at low resolution. That is, since the state is one in which edges are eliminated from the input state, annoying frequency components are few and a new high-resolution edge is created in a state in which the number of pixels is increased.

The input image information is sent to the linear interpolating means 101. As in the embodiment described above, one pixel of the pixel of interest is interpolated to (M×N) pixels. Edge creating means 601 creates an edge in the (M×N) pixels. As in the embodiment illustrated in FIG. 30, the edge creating means may be means which calculates allocation ratio for placing the pixel of interest from the MAX value and MIN value within the window and placing the pixels using sorting. Alternatively, in a simple arrangement, means may be adopted for creating an edge by calculating a threshold value [e.g., TH=(MAX+MIN)/2] from the MAX value and MIN value, and binarizing linearly interpolated information of (M×N) pixels based upon the calculated threshold value. The MAX and MIN values are substituted into the block after edge creation.

This edge information is a new edge suited to the new resolution. In the case of a natural picture, outputting this edge information as is would result in image of artificial picture tones with excessive edges and no gray levels. Therefore, smoothing is applied by smoothing means 602 in the new resolution in such a manner that this edge information will look like a natural picture. Smoothing can be realized by a filter.

In the embodiment described above, edge information and linearly interpolated information are added and combined, thereby making an image look like a natural picture. Pixel values of halftones along an edge can be presumed to be values generated owing to the LPF or, in effect, values (not very reliable values) dependent upon the original resolution. As a consequence, according to this embodiment in which linearly interpolated information is added and combined, it is possible to create an image in a state in which resolution dependency is removed to a greater extent.

In accordance with the fourth through sixth embodiments, therefore, a low-resolution image can be converted to a high-resolution image with ease. As a result, it is possible to provide communication between machine models having different resolution as well as printers and copiers which output high-quality images upon enlarging images by zooming.

<Seventh Embodiment>

Figure 43:
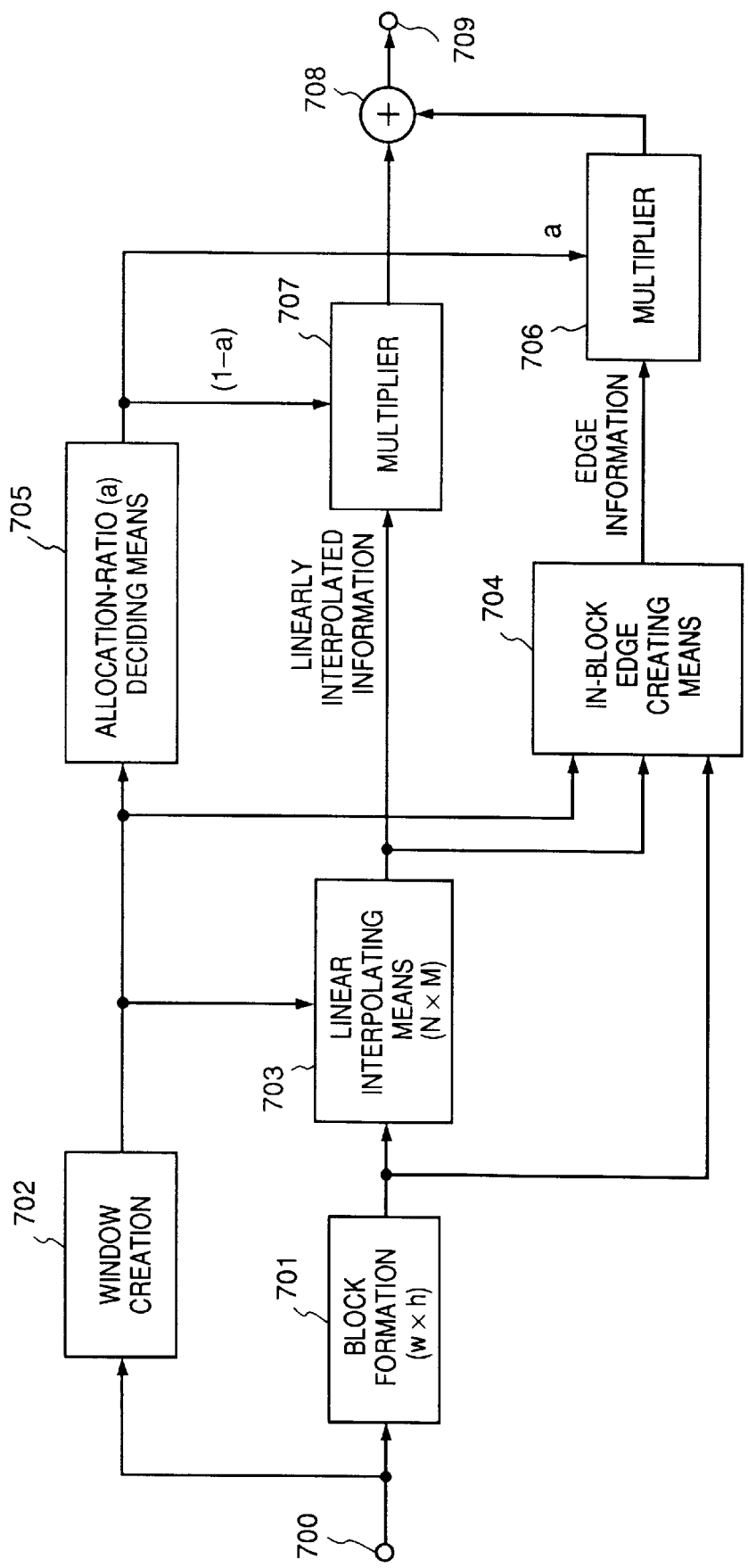
FIG. 43 is a block diagram showing a seventh embodiment.

FIG. 43 is a block diagram illustrating a seventh embodiment according to the present invention.

The operating procedure of this embodiment will now be described with reference to the block diagram of FIG. 43. Numeral 700 denotes an input terminal for entering low-resolution image information. In a case where this image processing apparatus is installed in an image output apparatus, the apparatus has line buffers for several lines or a page buffer for one line (the buffers are not shown), and the input low-resolution information is stored in these memories. The input low-resolution information is formed into blocks in rectangular units of w pixels horizontally and h pixels vertically by block forming means 701. The number of pixels of w, h is fixed and is set experimentally in conformity with ease of processing or line-buffer capacity beforehand. It should be noted that w, h are assumed to be integers equal to or greater than two. Numeral 702 denotes window setting means which, on the basis of the low-resolution information, creates a window which includes w×h pixels put in block form. The window is not limited to a rectangle. However, in a case where the window size is made a rectangle of (w'×h') pixels, w', h' are assumed to be values which satisfy w≦w' and h≦h'.

The information of every unit put in block form is sent to linear interpolating means 703. Here pixels between original samplings are filled in by linear interpolation processing (bi-linear interpolation processing) to create interpolated information increased by a factor of N vertically and M horizontally. It should be noted that N, M are integers equal to or greater than two. More specifically, in a block of w pixels horizontally and h pixels vertically, block information of (w×N) pixels horizontally and (h×M) pixels vertically is created. The linear interpolation processing is the same as that already described. In the linear interpolating means, not only information inside the block but also information of adjacent pixels is required. For this reason calculation is performed using the window created by the window creating means 702.

Numeral 704 denotes in-block edge creating means for creating an edge for each unit of (w×N) pixels and (h×M) pixels of the block of interest in the low-resolution information. The details of edge creation will be described later with reference to FIG. 44. Numeral 705 denotes allocation-ratio deciding means for calculating allocation ratio (denoted by "a", where $0 \leq a \leq 1$) when linearly interpolated information that has been created and edge information are combined. The allocation ratio also is decided in block units of (w×N)×(h×M) pixels. The decision of allocation ratio will be described later in detail. A multiplier 706 multiplies the edge information a times using the allocation ratio a obtained, and a multiplier 707 multiplies the linearly interpolated information by (1−a). The products calculated by the multipliers 706, 707 are combined by an adder 708. The result of converting the input image information to the information increased by a factor of N×M is outputted from an output terminal 709.

Figure 44:
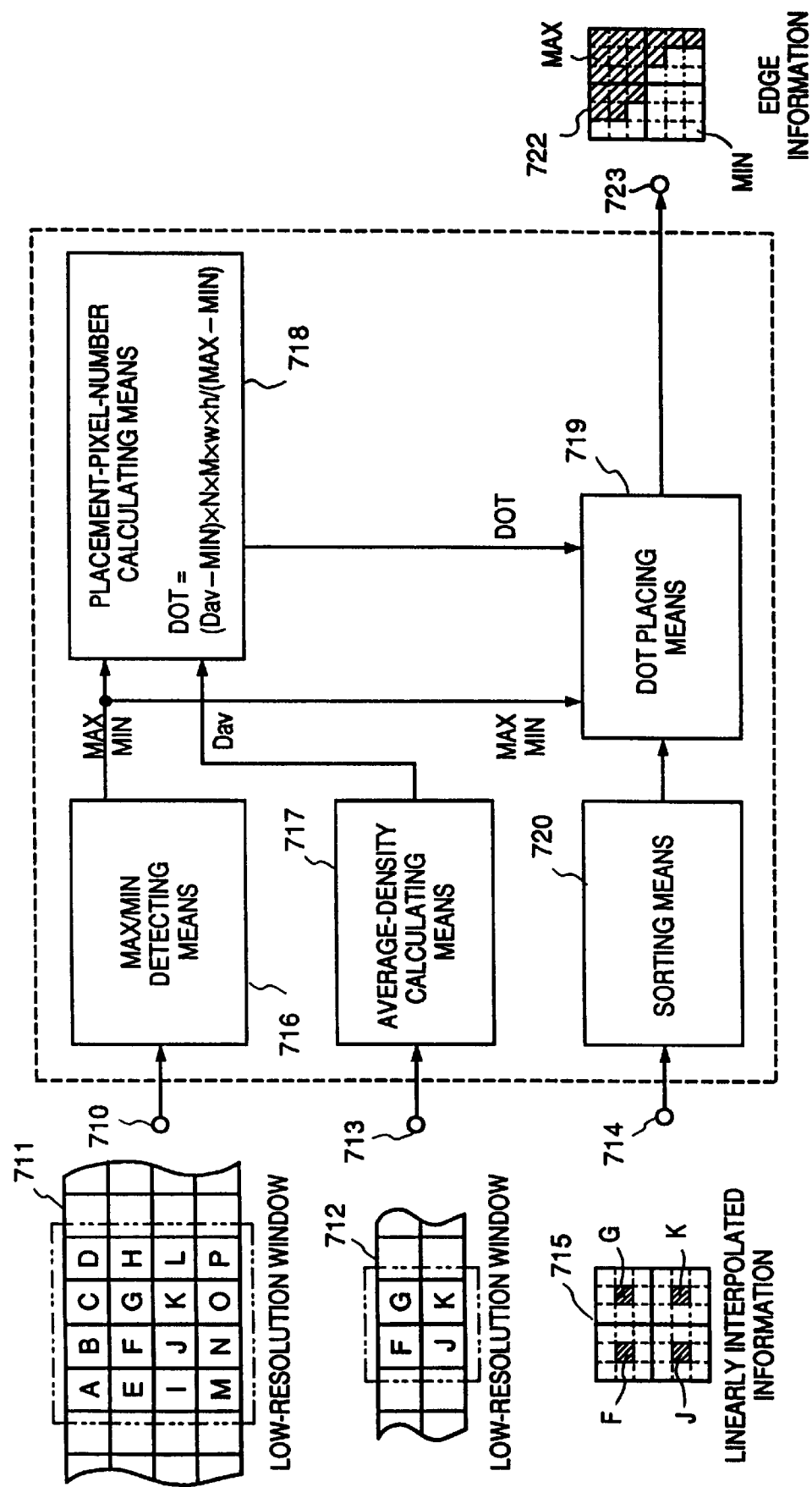
FIG. 44 is a block diagram showing edge creating means illustrated in FIG. 43.

FIG. 44 is a block diagram showing the in-block edge creating means 704 illustrated in FIG. 43. The components enclosed by the dashed line in FIG. 44 correspond to the edge creating means. Numeral 710 in FIG. 44 denotes an input terminal for low-resolution information. Information of pixel values inside the window indicated by the two-dot chain line at 711 is the input information. In this example the window is a rectangular window of size 4×4. That is, 16 pixels from A to P at 711 are adopted as a group of pixels inside the window. In this case, line buffers for a minimum of four lines are required. The area enclosed by the bold line in the window at 711 is adopted as the block of interest in this case. An example will be described in which the block size is 2×2. The four low-resolution pixels F, G, J, K are members in the block. The block thus cut out is indicated at 712. Numeral 714 denotes an input terminal from which the linearly interpolated information indicated at 715 enters. This is linearly interpolated information of four pixels within the block 712. Pixels indicated by hatching are the pixels F, G, J, K. The other pixels delimited by the dashed lines indicate interpolated pixels. In this example, enlargement is performed by a factor of 3×3. That is, according to this embodiment, window size is w'=h'=4, block size is w=h=2 and the enlargement ratio of interpolation is N=M=3.

The low-resolution information which enters from the input terminal 710 is applied to MAX/MIN detecting means 716, which detects a maximum value and a minimum value of the 16 pixels within the window. The low-resolution information which enters from the input terminal 710 is also applied to average-density calculating means 717, which calculates the average value of the four pixels F, G, J, K. The detected MAX and MIN information and the calculated average value (represented by Cav) are sent to placement-pixel number calculating means 718, which calculates the number of pixels of each of two representative values for creating an edge in each block. If we let DOTMAX represent the number of pixels for placing the pixel which MAX is representative value and let DOTMIN represent the number of pixels for placing the pixel which MIN is representative value, then the numbers of pixels will be decided by the following equations:

DOTMAX=(DAV−MIN)×$N$×$M$×$wh$/(MAX−MIN)

DOTMIN=$N$×$M$×$wh$ DOTMAX

The items of DOT information, MAX information and MIN information decided are transmitted to DOT placing means 719. Meanwhile, the 36 pixels of the block that has been subjected to linear interpolation entering from the input terminal 714 is sent to sorting means 720, which sorts the linearly interpolated pixels within the block in descending order of pixel values. The sorting algorithm itself is not defined here.

Each of the sorted pixels in the block of (w×N) pixels horizontally and (h×M) pixels vertically are substituted by the MAX value in a number equivalent to DOTMAX in descending order of the pixel values by the dot placing means 719, and the MIN value is substituted for the other pixels in the block. Information of a block in which binarization representatives are allocated in the form of MAX, MIN, as indicated at 722, is outputted from the output terminal 723.

Figure 45:
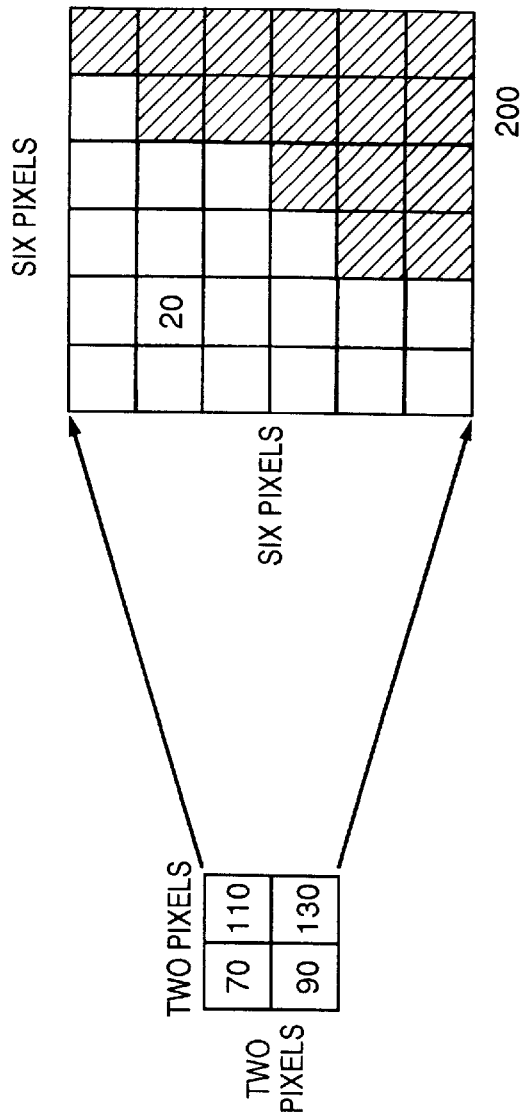
FIGS. 45A, 45B are diagrams showing an example of binarization.

FIGS. 45A, 45B illustrate an example in which an edge is created in a block. This will be described with regard to the equation for calculating DOT mentioned above. In the example of FIGS. 45A, 45B, it is assumed that the low-resolution information is converted to high-resolution information increased by a factor of N vertically and a factor of M horizontally. The example here is for a case in which N=M=3, w=h=2 hold.

Assume that the block of interest is a block of four pixels of "70", "110", "90", "130" situated at the center [see FIG. 45A].

In a case where high-resolution information is considered, the four pixels of low resolution define an edge portion in which two values of pixel "200" and pixel "20" are contained at a certain ratio. It is assumed that this has been set to four values ("70", "110", "90", "130") being an intermediate level since the resolution is made low. In other words, in a case where preservation of density is considered, we have the following if A represents the ratio of high resolution 200 contained per pixel in a block and B represents the ratio of 20:

200×A+20×B=80

Using the average density Dav per pixel and the variables MAX, MIN within the window gives us MAX×A+MIN×B=Dav Since it is assumed that A+B=1 holds, we have MAX×A+MIN×(1−A)=Dav That is, we have A=(Dav−MIN)/(MAX−MIN)

In order to enlarge one pixel of low resolution to information of (w×N) pixels horizontally and (h×M) pixels vertically, the number of pixels DOTMAX for placing MAX values is represented by the following:

DOTMAX=(D−MIN)×$N$×$M$×$wh$/(MAX−MIN)

In the example of FIGS. 45A, 45B, Dav=100, MAX=200, MIN=20, N=M=3, w=h=2. Therefore, when these are substituted into the above-mentioned equation, the number of pixels DOTMAX for placing MAX values becomes 16 pixels within the block. In other words, among 64 pixels, the value of 200, which is the MAX value, is substituted into 16 pixels is descending order of the pixel values, and the value of 20, which is the MIN value, is substituted into the remaining 20 pixels [see FIG. 45B].

Thus, an edge is created in a block corresponding to the pixel of interest.

By virtue of the edge creation processing described above, it is possible to create a smooth edge, namely high-resolution information, in the high-resolution dimension within a block.

Figure 46:
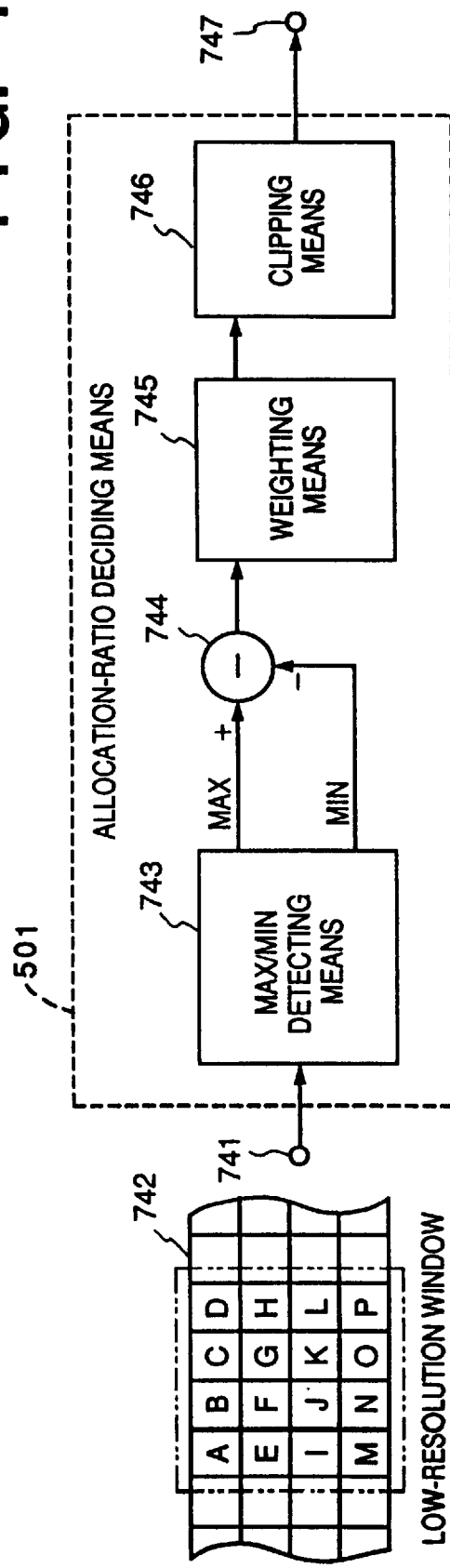
FIG. 46 is a diagram showing the details of allocation-ratio deciding means illustrated in FIG. 43.

FIG. 46 illustrates the construction of the allocation-ratio deciding means 705, (shown in FIG. 43) which is enclosed by the dashed line. The allocation-ratio deciding means has an input terminal 741 from which the low-resolution information indicated at 742 enters. As described in connection with FIG. 44, the portion enclosed by the two-dot chain line is the referential window, and the portion enclosed by the bold line is the block in which processing is executed. As in the manner of the edge creating means of FIG. 44, MAX and MIN values within the window are detected by MAX/MIN detecting means 743. It goes without saying that the detecting means within the edge creating means 401 (shown in FIG. 30) can be used as the MAX/MIN detecting means 743.

Numeral 444 denotes a subtractor for performing a (MAX−MIN) operation. That is, this operation corresponds to obtaining the dynamic range within the window. Numeral 745 denotes weighting means, which is a coefficient multiplier provided in order to decide whether the edge information, which prevails when the allocation ratio a is obtained, should be given more emphasis or less emphasis. The coefficient may be obtained experimentally in order to be optimized for the system. Alternatively, the coefficient may be decided in conformity with the image being handled. Numeral 746 denotes clipping means for clipping overflow of values due to multiplication by the coefficient. The allocation ratio a thus calculated is outputted from an output terminal 747 and supervises the combination of edge information and linearly interpolated information.

By virtue of the foregoing processing, the edge information created shows greater dependence at portions where edges are steep and the linearly interpolated information shows greater dependence at portions where edges are flat.

<Modification of Seventh Embodiment>

Figure 47:
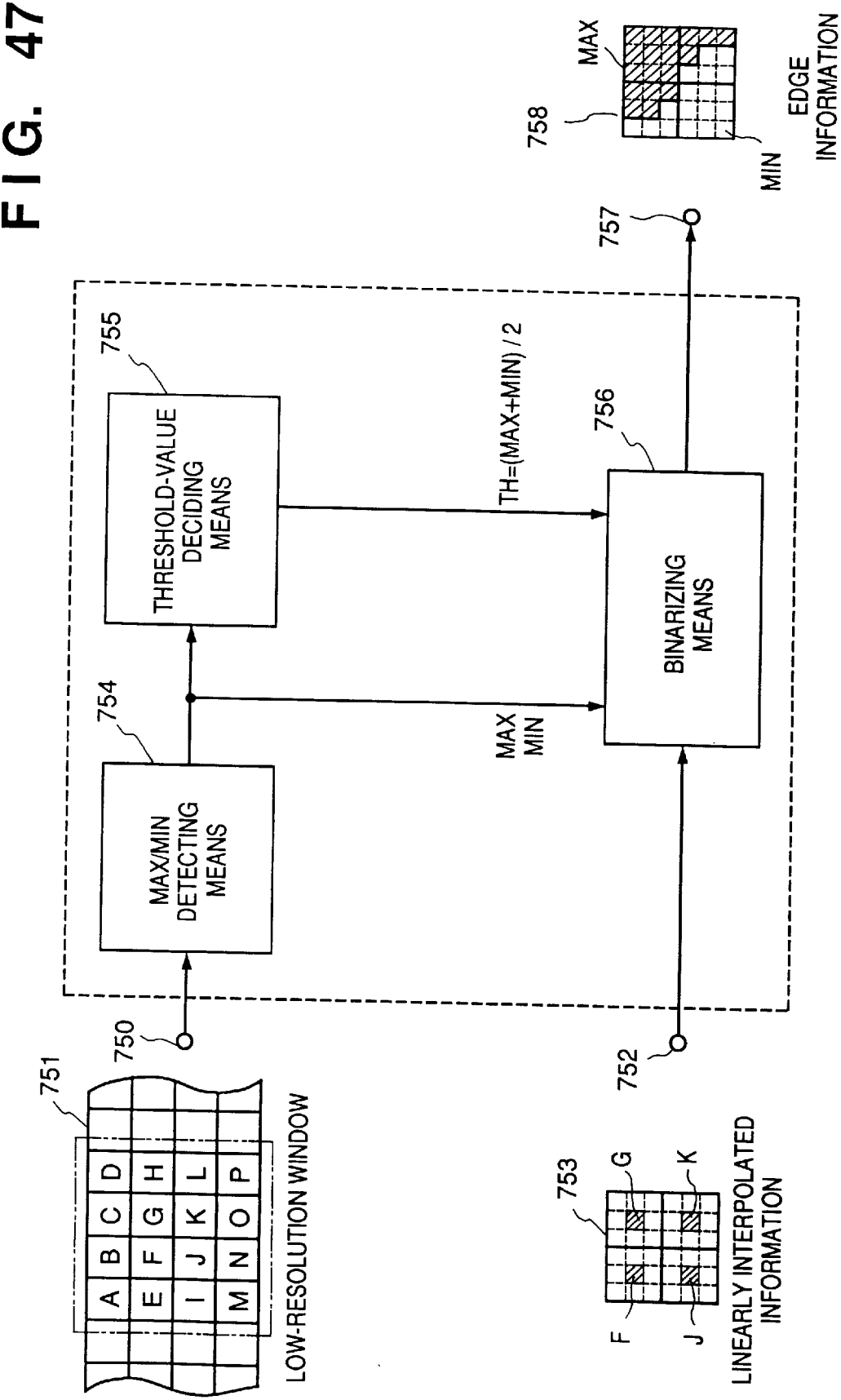
FIG. 47 is a block diagram showing edge creating means according to a modification.

FIG. 47 is a block diagram showing a modification of the seventh embodiment. The edge creating means of this modification differs from that of the foregoing embodiment. In this example, processing can be realized more easily than in the edge creating means shown in FIG. 44.

In FIG. 47, numeral 750 denotes an input terminal for entering low-resolution information. Information of pixel values within the window indicated by the two-dot chain line at 751 enters from e terminal 750. In this example the window is a rectangular window of size 4×4. That is, 16 pixels from A to P at 751 are adopted as a group of pixels inside the window. The area enclosed by the bold line in the window at 751 is adopted as the block of interest in this case. An example will be described in which the block size is 2×2. The four low-resolution pixels F, G, J, K are members in the block. Numeral 752 denotes an input terminal from which the linearly interpolated information in the block indicated at 753 enters. This is linearly interpolated information of four pixels of the block of interest. Pixels indicated by hatching are the pixels F, G, J, K. The other pixels delimited by the dashed lines indicate interpolated pixels. In this example, enlargement is performed by a factor of 3×3. That is, according to this embodiment, window size is w'=h'=4, block size is w=h=2 and the enlargement ratio of interpolation is N M=3.

The low-resolution information which enters from the input terminal 750 is applied to MAX/MIN detecting means 754, which detects a maximum value and a minimum value of the 16 pixels within the window.

The items of detected MAX information and MIN information are sent to threshold-value deciding means 755, which decides a threshold value for binarization to a binary value. In this embodiment, the threshold value (hereinafter denoted by "TH") is decided by the following equation:

$$TH=(MAX+MIN)/2$$

The items of decided threshold-value information and MAX, MIN information are sent to binarizing means 756, which binarizes the interpolated information of the block of interest that has been subjected to linear interpolation. A MAX value is allocated to interpolated pixels larger than the binarization threshold value, and a MIN value is allocated to interpolated pixels smaller than the threshold value. Information of a block in which binarization representatives indicated at 758 are allocated by MAX, MIN is outputted from an output terminal 757.

The foregoing is an example of edge creation. However, the means for creating edges block by block is not limited to this example.

Further, though an example in which w=h=2 is adopted in block formation is described, block size and window size obviously can be set at will.

Means may be provided for judging whether a block is to undergo edge creation depending upon the dynamic range of pixel values within the block, the ratio of dynamic range of pixels values within the block to the dynamic range of pixel values within the window, the difference between MAX, MIN of the pixel values within the block and MAX, MIN, respectively, within the window, etc. In other words, it is possible to perform edge creation only in blocks in which edges are present.

Though control will be more complicated, it is possible to make block size and window size variable in dependence upon pixel values.

In accordance with this embodiment as described above, edge information is estimated and created from input low-resolution information, and the edge information is added on. This makes it possible to create high-resolution information having sharp edges without visual blurring. Further, by adaptively changing the allocation ratio of linearly interpolated information and created edge information, non-linearity of edge size and edge shape is changed with ease. In particular, in a case where an input is a natural picture, it is possible to avoid image of artificial picture tones due to creation of artificial edges.

Further, since edge creation is performed in block units, excellent edges can be created.

In accordance with the embodiments, low-resolution image information can be converted to high-resolution information. As a result, it is possible to provide communication between machine models having different resolution as well as printers and copiers which output high-quality images upon enlarging images by zooming.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for converting low-resolution information to high-resolution information and increasing the number of pixels of input image information, comprising:

interpolating means for interpolating one pixel of low-resolution information to plural pixels;

edge information generating means for generating edge information in accordance with interpolation information having plural pixels obtained by said interpolating means;

setting means for setting an allocation ratio based on low-resolution information in a first referential area consisting of plural pixels; and adding means for adding the edge information generated by said edge information generating means and interpolation information from said interpolating means in accordance with the allocation ratio set by said setting means, wherein said adding means adds a value which multiplies the edge information by an allocation ratio to a value which multiplies interpolation information by (one minus the allocation ratio).

2. The apparatus according to claim 1, wherein said edge information generating means further comprises:

detecting means for detecting a first value and a second value from low-resolution information in a second referential area consisting of plural pixels; and quantizing means for quantizing interpolation information in a third referential area consisting of plural pixels, wherein said first and second values are allocated in accordance with a quantization result of said quantizing means.

3. The apparatus according to claim 2, wherein said detecting means detects a maximum value and a minimum value from the low-resolution information consisting of plural pixels.

4. The apparatus according to claim 3, wherein a threshold value at the time of quantization in said quantizing means is calculated from peripheral pixels of the low-resolution pixel of interest.

5. The apparatus according to claim 4, wherein when said quantization is binarization, a binarization threshold value is the average of the maximum and minimum values.

6. The apparatus according to claim 2, wherein the second referential area and the third referential area are the same.

7. The apparatus according to claim 1, wherein the allocation ratio in said setting means is decided by a width of pixel values peripheral to the low-resolution pixel of interest.

8. The apparatus according to claim 1, wherein the allocation ratio in said setting means is decided by a change in the width of pixel values peripheral to the low-resolution pixel of interest.

9. An image processing apparatus for converting low-resolution information to high-resolution information and increasing the number of pixels of input image information, comprising:

interpolating means for interpolating one pixel of low-resolution information to plural pixels;

edge information generating means for generating edge information in accordance with interpolation information having plural pixels obtained by said interpolating means;

setting means for setting an allocation ratio based on low-resolution information in a first referential area consisting of plural pixels; and combining means for adding and combining the edge information generated by said edge information generating means and interpolation information from said interpolating means in accordance with the allocation ratio set by said setting means, wherein a size of the first referential area peripheral to the low-resolution pixel of interest which decides the allocation ratio in said setting means is variable.

10. An image processing apparatus for converting low-resolution information to high-resolution information and increasing the number of pixels of input image information, comprising:

interpolating means for interpolating one pixel of low-resolution information to plural pixels;

edge information generating means for generating edge information in accordance with interpolation information having plural Pixels obtained by said interpolating means;

setting means for setting an allocation ratio based on low-resolution information in a first referential area consisting of plural pixels; and combining means for adding and combining the edge information generated by said edge information generating means and interpolation information from said interpolating means in accordance with the allocation ratio set by said setting means, wherein said edge information generating means further comprises:

detecting means for detecting a first value and a second value from low-resolution information in a second referential area consisting of plural pixels; and quantizing means for quantizing interpolation information in a third referential area consisting of plural pixels, wherein said first and second values are allocated in accordance with a quantization result of said quantizing means, and wherein a size of the second referential area peripheral to the low-resolution pixel of interest which decides the quantization representative in said arithmetic means is variable.

11. An image processing apparatus for converting low-resolution information to high-resolution information and increasing the number of pixels of input image information, comprising:

interpolating means for interpolating one pixel of low-resolution information to plural pixels;

edge information generating means for generating edge information in accordance with interpolation information having plural pixels obtained by said interpolating means;

setting means for setting an allocation ratio based on low-resolution information in a first referential area consisting of plural pixels; and combining means for adding and combining the edge information generated by said edge information generating means and interpolation information from said interpolating means in accordance with the allocation ratio set by said setting means, wherein said edge information generating means further comprises:

detecting means for detecting a first value and a second value from low-resolution information in a second referential area consisting of plural pixels; and quantizing means for quantizing interpolation information in a third referential area consisting of plural pixels, wherein said first and second values are allocated in accordance with a quantization result of said quantizing means, and wherein a size of the third referential area peripheral to the low-resolution pixel of interest which decides quantization conditions such as threshold value in said quantizing means is variable.

12. An image processing apparatus for converting low-resolution information to high-resolution information and increasing the number of pixels of input image information, comprising:

smoothing means for smoothing the low-resolution information;

interpolating means for interpolating one pixel of low-resolution information to plural pixels in accordance with the information smoothed by said smoothing means; and edge information generating means for generating edge information in accordance with interpolation information having plural pixels obtained by said interpolating means, wherein said edge information generating means comprises:
  detecting means for detecting a first value and a second value from peripheral pixels of the low-resolution pixel of interest;
  binarizing means for binarizing the interpolation information from said interpolating means; and
  placing means for placing the detected first and second values in accordance with a binarizing result from said binarizing means.

13. The apparatus according to claim 12, further comprising subsampling means for subsampling high-resolution information after placement by said placing means, wherein processing by said smoothing means, said interpolating means, said binarizing means, said placing means and said subsampling means is each repeatedly executed a plurality of times.

14. The apparatus according to claim 13, wherein the number of repetitions is controlled based upon a comparison between an image which has undergone repetitive processing and an unprocessed image.

15. The apparatus according to claim 12, wherein smoothing processing by said smoothing means is changed over adaptively based upon pixel values peripheral to the low-resolution pixel of interest.

16. The apparatus according to claim 13, wherein smoothing processing by said smoothing means is changed over in dependence upon the number of repetitions.

17. The apparatus according to claims 12, further comprising pattern detecting means for detecting a pattern of inputted image information, wherein smoothing conditions of said smoothing means are changed over by the pattern detected by said pattern detecting means.

18. The apparatus according to claim 12, wherein said interpolating means performs interpolation processing by linear interpolation.

19. An image processing apparatus for enlarging a low-resolution pixel of interest to a block of plural pixels and converting a low resolution image to a high-resolution image, comprising:

interpolating means for interpolating one pixel of low-resolution information to plural pixels; and edge information generating means for generating edge information in accordance with interpolation information having plural pixels obtained by said interpolating means, wherein said edge information generating means comprises:
  detecting means for detecting a first value and a second value from peripheral pixels of the pixel of interest;
  deciding means for deciding an allocation ratio at which the first and second values detected by said detecting means are placed inside the block; and
  placing means for placing the first and second values in dependence upon the allocation ratio decided by said deciding means,
  wherein said deciding means decides an allocation ratio so that so that a total value of the first and second values placed inside the block becomes approximately equal to a product of the information of one pixel of low-resolution information and the number of said plural pixels.

20. The apparatus according to claim 19, wherein said edge information generating means further comprises sorting means for sorting information having plural pixels in the block interpolated by said interpolating means, and wherein said placing means places said first and second values in accordance with the numbers of pixels decided by said deciding means and a sorting order of said sorting means.

21. The apparatus according to claim 19, wherein said placing means places the first and second values inside the block depending upon a size relationship and ratio between the peripheral pixels.

22. The apparatus according to claim 19, wherein said placing means calculates a corner having a largest value among four corners surrounding the pixel of interest and places the first and second values inside the block depending upon the ratio between pixels neighboring said corner on both sides thereof.

23. The apparatus according to claim 19, wherein said placing means places the first and second values inside the block depending upon a ratio between pixels above and below the pixel of interest or a ratio between pixels to the left and right of the pixel of interest.

24. An image processing apparatus for converting low-resolution information to high-resolution information and increasing the number of pixels of input image information, comprising:

interpolating means for interpolating one pixel of low-resolution information to plural pixels;

setting means for setting an allocation ratio based on low-resolution information in a first referential area consisting of plural pixels;

detecting means for detecting a first value and a second value from low-resolution information in a second referential area consisting of plural pixels; and combining means for adding and combining the first value or second value detected by said detecting means and interpolation information from said interpolating means in accordance with the allocation ratio set by said setting means, wherein a size of the second referential area, peripheral to the low-resolution pixel of interest, is variable.

25. A method for converting low-resolution information to high-resolution information and increasing the number of pixels of input image information, comprising the steps of:

interpolating one pixel of low-resolution information to plural pixels;

setting an allocation ratio based on low-resolution information in a first referential area consisting of plural pixels;

detecting a first value and a second value from low-resolution information in a second referential area consisting of plural pixels; and adding and combining the first value or second value detected in the detecting step and the interpolated information generated in the interpolating step in accordance with the allocation ratio set in the setting step, wherein a size of the second referential area, peripheral to the low-resolution information of interest, is variable.

* * * * *

UNITED STATES PATENT AND TRADEMARK OFFICE
CERTIFICATE OF CORRECTION

PATENT NO. : 5,875,268
DATED : February 23, 1999
INVENTOR(S) : NOBUTAKA MIYAKA

It is certified that error appears in the above-identified patent and that said Letters Patent is hereby corrected as shown below:

COLUMN 5

Equation 3, "(Eq. 3)" should read --(Eq. 2)--.

COLUMN 9

Line 30, "smoothened" should read --smoothed--.
    Line 31, "smoothened" should read --smoothed--.
    Line 52, "smoothened" should read --smoothed--.

COLUMN 10

Line 31, "where by optimum filter is selected." should read --whereby the optimum filter is selected.--.

COLUMN 11

Line 29, "smoothened." should read --smoothed.--

COLUMN 18

Line 9, "vales" should read --valves--.

UNITED STATES PATENT AND TRADEMARK OFFICE
CERTIFICATE OF CORRECTION

PATENT NO. : 5,875,268

DATED : February 23, 1999

INVENTOR(S) : NOBUTAKA MIYAKA

It is certified that error appears in the above-identified patent and that said Letters Patent is hereby corrected as shown below:

COLUMN 19

Line 14, "a shown" should read --$\alpha$ shown--.
    Line 54, "is can" should read --it can--.
    Line 56, "is can" should read --it can--.

COLUMN 20

Line 60, "41A-41C." should read --41A-41C.--.

COLUMN 21

Line 52, "an natural" should read --a natural--.

COLUMN 23

Line 65, "[DAV" should read --[Dav--.

COLUMN 24

Line 65, "is descending" should read --in descending--.

UNITED STATES PATENT AND TRADEMARK OFFICE
CERTIFICATE OF CORRECTION

PATENT NO. : 5,875,268

DATED : February 23, 1999

INVENTOR(S) : NOBUTAKA MIYAKA

It is certified that error appears in the above-identified patent and that said Letters Patent is hereby corrected as shown below:

COLUMN 25

Line 7, "705," should read --705--; and "43)" should read --43),--.

COLUMN 26

Line 25, "pixels" should read --pixel--.

COLUMN 28

Line 5, "Pixels" should read --pixels--.

COLUMN 29

Line 37, "claims" should read --claim--.
    Line 67, "so that" (second occurrence) should be deleted.

Signed and Sealed this

Fourth Day of January, 2000

*Attest:*

*Attesting Officer*  *Acting Commissioner of Patents and Trademarks*